United States Patent
Wu et al.

(10) Patent No.: US 10,788,329 B2
(45) Date of Patent: Sep. 29, 2020

(54) NETWORK SYSTEM FOR MULTI-LEG TRANSPORT

(71) Applicant: Uber Technologies, Inc., San Francisco, CA (US)

(72) Inventors: Bin Wu, San Francisco, CA (US); Khang Tran, San Francisco, CA (US); Yuehai Xu, San Francisco, CA (US); Ruiyan Zhou, San Francisco, CA (US); Anurag Gupta, San Francisco, CA (US); Vishnu Srinivasan Sundaresan, San Francisco, CA (US); Meisam Vosoughpour Yazdchi, San Francisco, CA (US); Yawen Wei, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 339 days.

(21) Appl. No.: 15/866,172

(22) Filed: Jan. 9, 2018

(65) Prior Publication Data
US 2019/0212157 A1    Jul. 11, 2019

(51) Int. Cl.
*G01C 21/00* (2006.01)
*G01C 21/34* (2006.01)
*H04W 4/40* (2018.01)
*G06Q 50/30* (2012.01)

(52) U.S. Cl.
CPC ..... *G01C 21/3438* (2013.01); *G01C 21/3423* (2013.01); *G06Q 50/30* (2013.01); *H04W 4/40* (2018.02)

(58) Field of Classification Search
None
See application file for complete search history.

(56) References Cited

U.S. PATENT DOCUMENTS

| 7,970,749 | B2 | 6/2011 | Uhlir |
| 8,630,987 | B2 | 1/2014 | Dhuse |
| 8,775,070 | B1 * | 7/2014 | Bhatia ............... G01C 21/3461 701/425 |

(Continued)

FOREIGN PATENT DOCUMENTS

| CN | 106651728 | 5/2017 |
| EP | 3046058 | 7/2016 |

(Continued)

OTHER PUBLICATIONS

ISR and Written Opinion in PCT/US2018/055256 dated Jan. 30, 2019.

(Continued)

*Primary Examiner* — Jonathan M Dager
(74) *Attorney, Agent, or Firm* — Mahamedi IP Law LLP

(57) ABSTRACT

A multi-leg transport system receives a transport request and determines a number of transfer locations between the origin location and the destination. The system selects a first provider to transport the user from the origin location to a transfer location and remotely monitors the position of the user as the user travels to the transfer location. In response to determining that the travel time to the transfer location is within a threshold, the system selects a second provider to transport the user from the transfer location to either the next transfer location or the destination for the transport request.

18 Claims, 12 Drawing Sheets

(56) References Cited

U.S. PATENT DOCUMENTS

| | | | |
|---|---|---|---|
| 10,082,793 B1 | 9/2018 | Glaser | |
| 10,203,212 B2* | 2/2019 | Mazzella | G06Q 10/04 |
| 10,416,677 B2* | 9/2019 | Dean | G01C 21/3492 |
| 2004/0158483 A1* | 8/2004 | Lecouturier | G06Q 10/025 |
| | | | 705/6 |
| 2007/0150375 A1 | 6/2007 | Yang | |
| 2008/0014908 A1* | 1/2008 | Vasant | H04L 67/18 |
| | | | 455/414.1 |
| 2008/0027772 A1 | 1/2008 | Gernega | |
| 2009/0005963 A1* | 1/2009 | Jarvinen | G08G 1/096883 |
| | | | 701/533 |
| 2009/0192851 A1* | 7/2009 | Bishop | G06Q 10/08 |
| | | | 705/26.3 |
| 2010/0070168 A1 | 3/2010 | Sumcad | |
| 2011/0246246 A1* | 10/2011 | Johnson | G06Q 50/14 |
| | | | 705/5 |
| 2012/0233246 A1* | 9/2012 | Guemez | G06Q 40/00 |
| | | | 709/203 |
| 2012/0239452 A1* | 9/2012 | Trivedi | G06Q 10/00 |
| | | | 705/7.22 |
| 2012/0290337 A1* | 11/2012 | Helmy | G06Q 10/02 |
| | | | 705/5 |
| 2013/0054281 A1* | 2/2013 | Thakkar | G06Q 50/30 |
| | | | 705/5 |
| 2013/0218455 A1* | 8/2013 | Clark | G06Q 50/30 |
| | | | 701/411 |
| 2013/0226365 A1* | 8/2013 | Brozovich | G06Q 50/30 |
| | | | 701/1 |
| 2014/0129951 A1* | 5/2014 | Amin | G06Q 30/06 |
| | | | 715/738 |
| 2014/0173511 A1* | 6/2014 | Lehmann | G06Q 10/02 |
| | | | 715/810 |
| 2014/0207375 A1* | 7/2014 | Lerenc | G06Q 10/06 |
| | | | 701/527 |
| 2015/0055178 A1 | 2/2015 | Ishibashi | |
| 2015/0073645 A1 | 3/2015 | Davidsson | |
| 2015/0081581 A1* | 3/2015 | Gishen | G06Q 10/083 |
| | | | 705/330 |
| 2015/0100238 A1* | 4/2015 | Cai | G01C 21/34 |
| | | | 701/537 |
| 2015/0154810 A1* | 6/2015 | Tew | G06Q 30/0202 |
| | | | 705/7.31 |
| 2015/0161564 A1 | 6/2015 | Sweeney | |
| 2015/0254581 A1* | 9/2015 | Brahme | G06F 16/29 |
| | | | 705/5 |
| 2015/0323327 A1* | 11/2015 | Lord | G01C 21/3423 |
| | | | 701/465 |
| 2015/0323330 A1* | 11/2015 | Lord | G01C 21/3438 |
| | | | 701/410 |
| 2015/0323331 A1* | 11/2015 | Lord | G01C 21/3423 |
| | | | 701/410 |
| 2015/0325128 A1* | 11/2015 | Lord | G08G 1/005 |
| | | | 705/13 |
| 2015/0339923 A1 | 11/2015 | Konig | |
| 2015/0339928 A1* | 11/2015 | Ramanujam | G06Q 50/30 |
| | | | 701/23 |
| 2015/0352128 A1 | 12/2015 | Villa et al. | |
| 2016/0019496 A1 | 1/2016 | Gorlin | |
| 2016/0026935 A1 | 1/2016 | Botea | |
| 2016/0026936 A1* | 1/2016 | Richardson | G06Q 10/02 |
| | | | 705/5 |
| 2016/0034845 A1 | 2/2016 | Hiyama | |
| 2016/0132792 A1* | 5/2016 | Rosnow | G06F 3/0484 |
| | | | 705/5 |
| 2016/0231129 A1* | 8/2016 | Erez | G01C 21/3423 |
| 2016/0301698 A1 | 10/2016 | Katara | |
| 2016/0321771 A1* | 11/2016 | Liu | G01C 21/3438 |
| 2016/0364679 A1* | 12/2016 | Cao | G06Q 50/30 |
| 2016/0364823 A1* | 12/2016 | Cao | G06Q 50/30 |
| 2016/0370194 A1* | 12/2016 | Colijn | G08G 1/22 |
| 2017/0115125 A1 | 4/2017 | Outwater | |
| 2017/0147959 A1* | 5/2017 | Sweeney | G07C 5/008 |
| 2017/0169535 A1* | 6/2017 | Tolkin | G06Q 10/06311 |
| 2017/0191841 A1* | 7/2017 | Marueli | G01C 21/20 |
| 2017/0191845 A1* | 7/2017 | Marueli | G01C 21/20 |
| 2017/0200249 A1 | 7/2017 | Ullrich | |
| 2017/0240098 A1 | 8/2017 | Sweeney | |
| 2017/0255881 A1 | 9/2017 | Ritch | |
| 2017/0270794 A1 | 9/2017 | Sweeney | |
| 2017/0272901 A1 | 9/2017 | Sweeney | |
| 2018/0306595 A1* | 10/2018 | Marueli | G01C 21/20 |
| 2018/0374350 A1 | 12/2018 | Sweeney | |
| 2019/0109910 A1* | 4/2019 | Sweeney | H04L 67/306 |
| 2019/0172353 A1 | 6/2019 | Chen | |

FOREIGN PATENT DOCUMENTS

| | | |
|---|---|---|
| JP | 2004-302942 | 10/2004 |
| WO | WO 2011-120161 | 10/2011 |
| WO | WO 2017/079222 | 5/2017 |

OTHER PUBLICATIONS

How to request multiple Uber vehicles, Aug. 15, 2013 (https://www.wikihow.com/ Request-Multiple-Uber-Vehicles.

How to book two cabs at the same time in Uber, Jun. 30, 2017 (https://fastandclean.org/ book-two-cabs-time-uber).

Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.

Written Opinion in PCT/US2018/055256 dated Jul. 19, 2019.

ISR and Written Opinion dated Apr. 30, 2019 in PCT/US2019/012902.

ISR and Written Opinion in PCT/US2017/023350 dated Jun. 29, 2017.

ISR and Written Opinion in PCT/US2017/023343 dated Jul. 6, 2017.

EESR in EP 17771000.1 dated Mar. 21, 2019.

\* cited by examiner

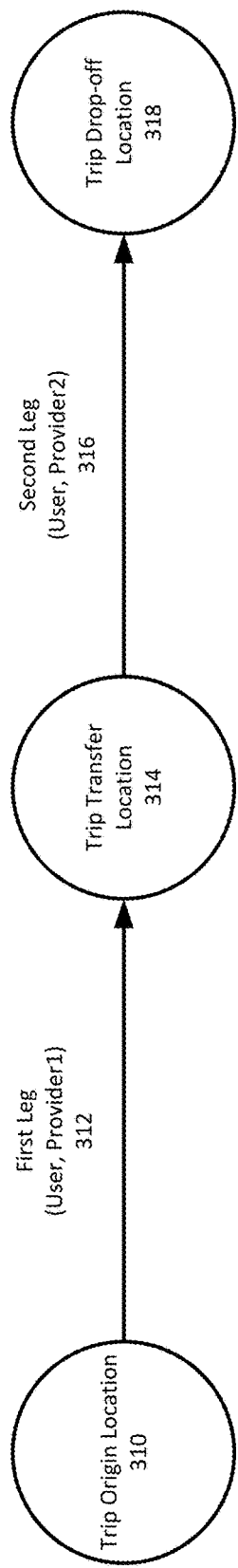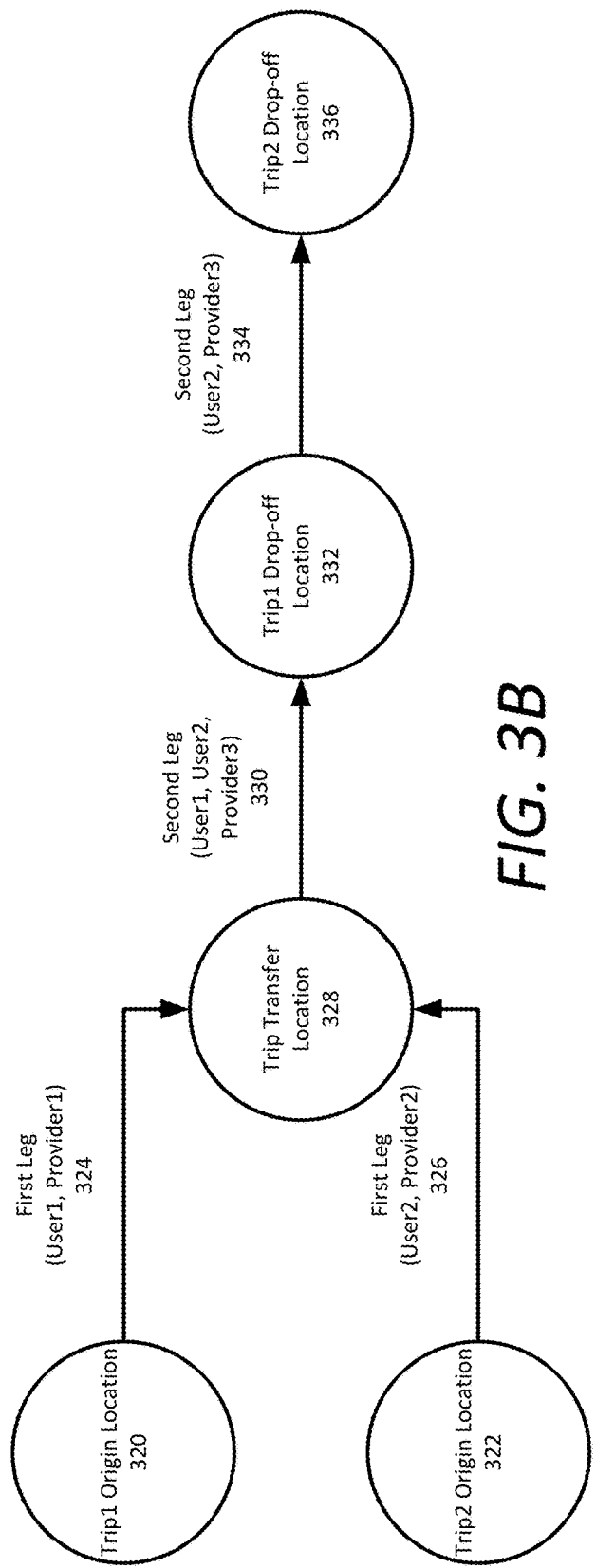
FIG. 3A
FIG. 3B

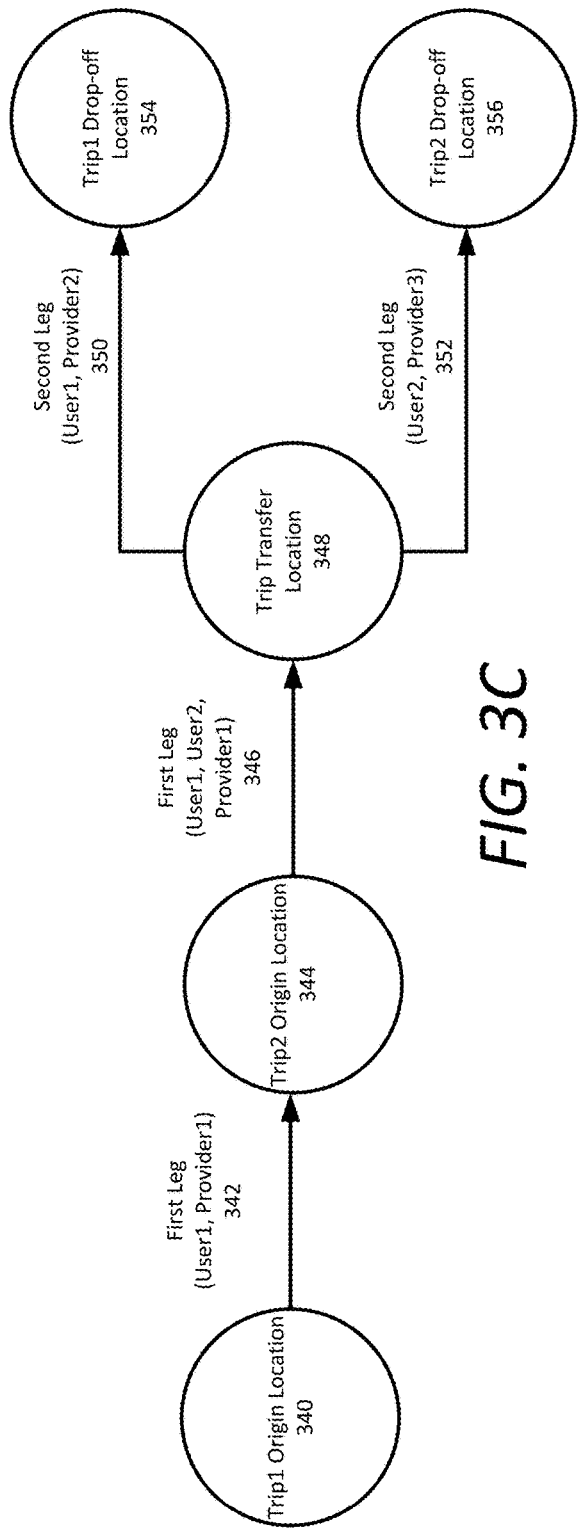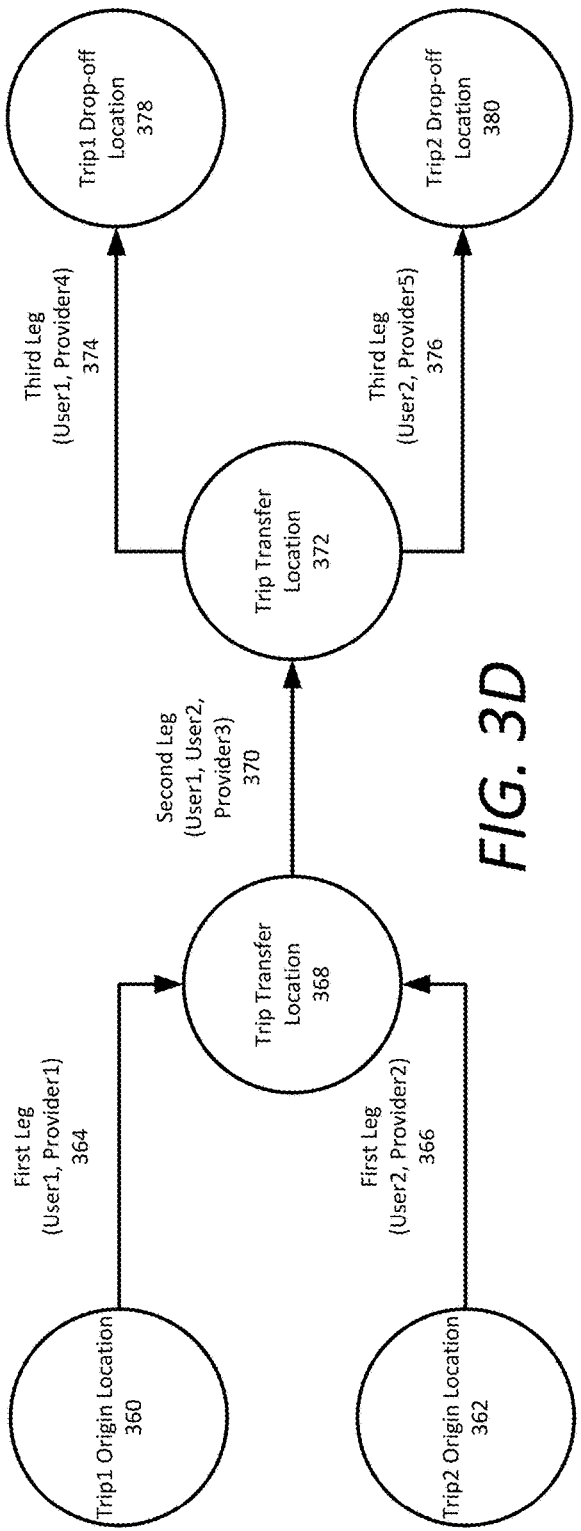

NETWORK SYSTEM FOR MULTI-LEG TRANSPORT

BACKGROUND

A network service can enable users to request and receive various services through applications on mobile computing devices. The network service typically selects a service provider to fulfill the request for service based on user-specified data from the request, including a starting location (e.g., a pickup location) and an ending location (e.g., a destination). Service providers can interact with the network service to accept or decline service requests, receive data about the requesting users, and set various status modes such as whether the provider is online and available to fulfill requests or offline.

BRIEF DESCRIPTION OF THE DRAWINGS

FIGS. 3A-D are block diagrams illustrating example multi-leg transport scenarios, in accordance with examples described herein.

DETAILED DESCRIPTION

Figure 1:
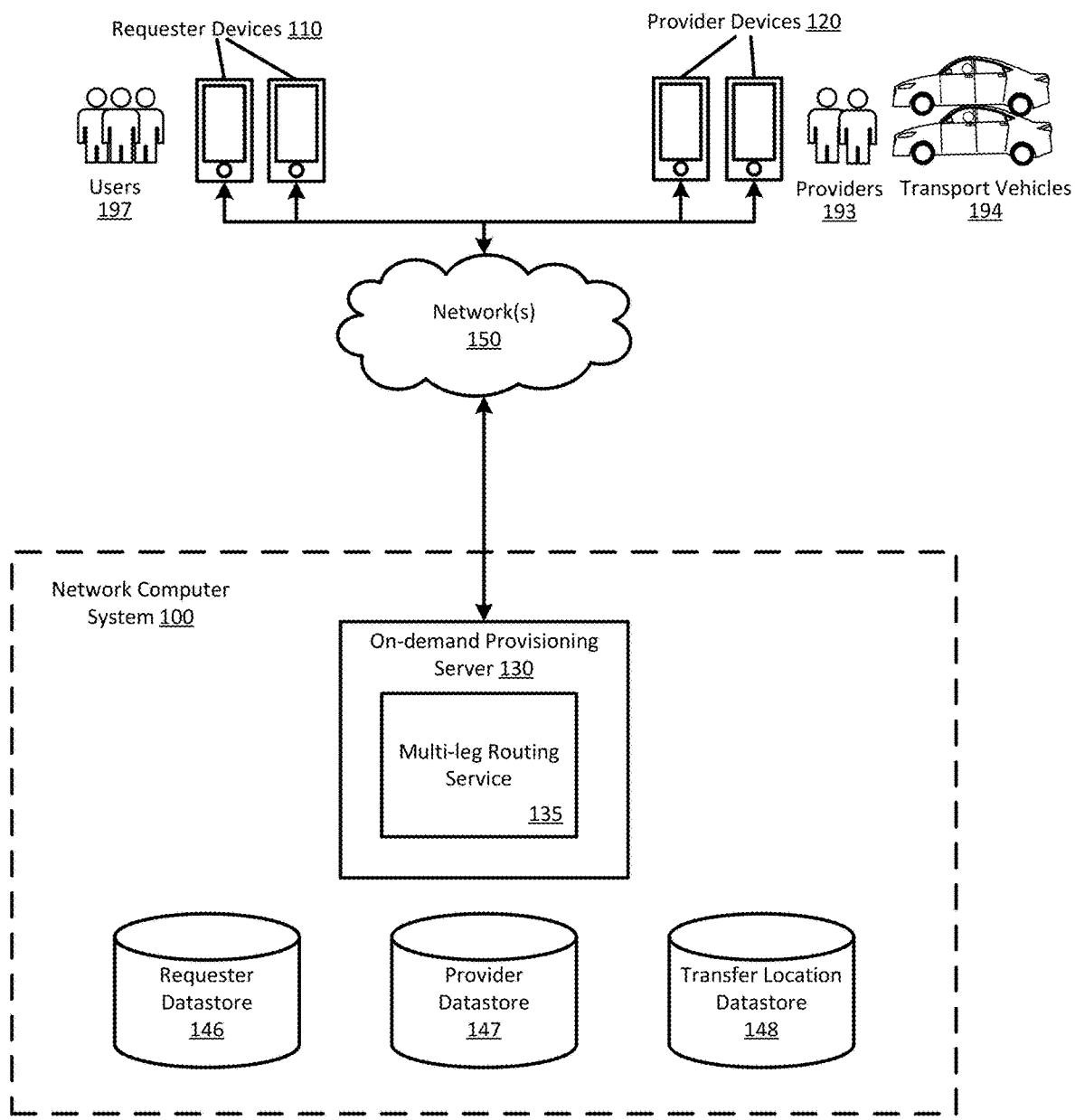
FIG. 1 is a block diagram illustrating an example network computer system in communication with service requester and service provider devices, in accordance with examples described herein.

A network computer system is provided herein that manages an on-demand network service linking available service providers with service requesters throughout a given region (e.g., a metroplex such as the San Francisco Bay Area). According to examples, the network computer system can receive service requests for on-demand services (e.g., transport service or delivery service) from requesting users (e.g., potential riders) via a designated service requester application executing on the users' mobile computing devices. Based on a service start location or other waypoints, the network computer system can identify a number of proximately available service providers (e.g., drivers or autonomous vehicles) and transmit a service invitation message to one or more service provider devices of the proximately available service providers to fulfill the service request (e.g., provide or perform the corresponding service). In many examples, the service providers can either accept or decline the invitation based on, for example, the service start location or service destination being impractical for the service provider.

In some aspects, a user can transmit, via the service requester application, a request for multi-leg transport from a starting location to a destination. Unlike conventional transport services that operate point-to-point single-leg transportation, a multi-leg routing service can partition the distance between the starting location and destination into multiple routes, or legs, between transfer locations, with the first leg beginning at the starting location and the last leg ending at the destination. The multi-leg routing service can arrange for a separate service provider to provide service along each of the legs, with each service provider being chosen in real-time as the user approaches the next transfer location.

According to some aspects, the selection of the providers for each of the legs is performed programmatically based on parameters such as the transfer location, the estimated times to arrival to the transfer location for the user and provider, the next transfer location or destination, estimated trip time to the next transfer location or destination, wait times, and any constraints imposed by the provider, such as a time limit or geographic restriction (e.g., the provider wants to finish by a certain time or does not want to leave a certain area). Individual providers selected as respondents to the user request may have the option to accept the request. Once a provider is selected and has accepted the assignment, information about the provider (e.g., the location of the provider, a picture of the provider, the provider's rating, etc.) may be communicated to the user's computing device. The provider may also be provided information about the user (e.g., a picture of the user, the user's rating, the user's precise location, etc.). Additionally, for each leg of the transport, some aspects provide that the user is provided updates as to the location of the vehicle of the provider en route to the transfer location. The updates may be provided in real-time or near real-time to reflect the progression of the provider towards the transfer location.

In some examples, the user can pre-select the number of legs desired when submitting the request through a user interface of the service requester application. In other examples, the multi-leg routing service can determine an appropriate number of legs depending on factors such as the total distance, estimated time, cost, supply provisioning data, etc.

Conventional on-demand service systems experience numerous technical challenges, including mapping routes through geographic regions efficiently and balancing the supply and demand of multiple regions. Among other benefits, a network computer system can address these challenges by implementing multi-leg transport. For example, multi-leg transport can be used to send multiple users to a transfer location where they can be picked up by a single service provider, thereby increasing occupancy and reducing costs to users. In another example, a user requesting transport in an undersupplied area can be taken to a transfer location just outside of the undersupplied area or just inside an oversupplied area, allowing that provider to return to the undersupplied area and another provider to transport the user to the destination, thereby achieving a more balanced supply provisioning situation.

Among other challenges, it is difficult to schedule long distance rides in on-demand transport systems because providers rarely want to incur the inconvenience of travelling long distances or driving in unfamiliar areas. Multi-leg transport, on the other hand, allows a user to travel long distances with multiple providers, each of whom can transport the user partway and remain in their preferred areas. Furthermore, users can lower costs by minimizing the distance travelled in a high-demand, increased cost area by taking a multi-leg trip to a transfer location in an area without increased costs. In addition to personal transport scenarios, multi-leg transport can be used to deliver food or other items further than would be feasible with a single provider.

According to some aspects, a network computer system for managing an on-demand transport service receives, over a network, data corresponding to a transport request from a device of a user. The transport request can include an origin location (e.g., a pickup location) in a first geographic region and a destination in a second geographic region. The network computer system determines transfer locations for the transport request, including at least a first transfer location, between the origin location and the destination. The network computer system also generates a route from the origin location to the first transfer location. The network computer system selects a first provider from one or more candidate providers to transport the user from the origin location to the first transfer location, and remotely monitors the position of the user as the user travels along the first route to the first transfer location. The network computer system queries mapping resources to determine first travel time on the first route to the first transfer location. The first travel time is based, among other possible factors, on a distance between the position of the user and the first transfer location, traffic conditions, and time to perform aspects of the on-demand transport service. In response to determining that the first travel time is within a first threshold amount of time, the network computer system selects a second provider to transport the user from the first transfer location to either a second transfer location or the destination for the transport request.

In examples with multiple transfer locations (i.e., routes divided into three or more legs), the network computer system determines the next transfer location between the first transfer location and the destination. In one implementation, the network computer system selects each of the transfer locations at the start, in response to receiving the transport request or shortly thereafter. In other implementations, the network computer system can wait to select the next transfer location until the user is approaching the current transfer location, thereby allowing the network computer system to react to changes in traffic and provider availability in the time since the original request was made.

As with the first leg, the network computer system remotely monitors the position of the user as the user travels along the second route to the next transfer location and queries the mapping resources to determine a second travel time. In response to determining that the second travel time is within a second threshold amount of time, the network computer system selects a third provider to transport the user to the next waypoint, either another transfer location or the destination for the transport request.

Among other features, at least some aspects provide that the geographic location of the respective parties is determined programmatically using geo-aware resources, such as a GPS receiver. This information is communicated to the other party without the need for manual involvement by the party operating the device. Thus, for example, when the user makes the request for transport, the user's location at the time of making the request can be included automatically in the request. Further, when the provider accepts the request and starts to travel to user/transfer location, the provider's location and other relevant information (such as a continuously updated estimated time of arrival) can be automatically communicated to the user.

As provided herein, the terms "user" and "service requester" are used throughout this application interchangeably to describe a person or group of people who utilize a service requester application on a computing device to request, over one or more networks, on-demand services from a network computer system. In some aspects, the terms "service provider" and "provider" are used to describe a person utilizing a service provider application on a computing device to provide on-demand services to the service requesters. In other aspects, the term "service provider" and "provider" can describe an autonomous entity (e.g., an autonomous vehicle) that communicates with the network computer system to provide the on-demand services to the service requesters.

One or more aspects described herein provide that methods, techniques, and actions performed by a computing device are performed programmatically or as a computer-implemented method. Programmatically means through the use of code or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried out or executed. In particular, the numerous machines shown in some examples include processors and various forms of storage media for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of interconnected logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected logic gates.

System Overview

FIG. 1 is a block diagram illustrating an example network computer system 100 in communication with service requester and service provider devices, in accordance with examples described herein. The network computer system 100 can implement or manage a network service (e.g., an on-demand transport or delivery arrangement service) that connects service requesters, or users 197, with service providers 193 that are available to fulfill the service requests that users 197 transmit to the network computer system 100. An on-demand provisioning server 130 can provide a platform which enables users 197 to submit requests over a network 150 through a service requester application executing on the service requester devices 110. The network service processes and transmits the requests to appropriate service providers 193 by way of a service provider application executing on the service provider devices 120. As used herein, a service requester device 110 and a service provider device 120 comprise computing devices with functionality to execute designated applications corresponding to the network service managed by the network computer system 100. Example service requester devices 110 and service provider devices 120 include mobile computing devices, such as smartphones, tablet computers, virtual reality or augmented reality headsets, on-board computing systems of vehicles, and the like. Example network services can comprise delivery of food or products, package mailing, shopping, construction, plumbing, home repair, housing or apartment sharing, etc., or can include transportation arrangement services. In an example using transport arrangement services, the users 197 are prospective passengers to be picked up and transported, and the service providers 193 are drivers who transport the users 197 in transport vehicles 194.

In some aspects, a user 197 can transmit, via the service requester application, a request for multi-leg transport from a starting location to a destination. In contrast to a single-leg request, a multi-leg request can partition the distance between the starting location and destination into multiple routes, or legs, between transfer locations, with the first leg beginning at the starting location and the last leg ending at the destination. The multi-leg routing service 135 can arrange for a separate service provider 193 to provide service along each of the legs, with each service provider 193 being chosen in real-time as the user 197 approaches the next transfer location. Using the service request interface of the service requester application, the user 197 can select how many legs they prefer for the service request.

In other aspects, the user 197 can transmit a request for service without specifying multiple legs, and the on-demand provisioning server 130 can determine whether the request should be serviced as a single-leg or multi-leg trip. In one example, the multi-leg routing service 135 determines the distance and time required between the origin location and destination of the request, and if either the distance or time exceeds a threshold limit (e.g., a distance that providers 193 in the region do not regularly exceed based on historical data), the multi-leg routing service 135 can break the trip into multiple legs. In another example, the multi-leg routing service 135 compares estimates of the costs (to the user 197, providers 193, and/or the transport service) of a single-leg trip and a number of possible multi-leg trips. In one implementation, the multi-leg routing service 135 can present multiple trip options and their costs to the user 197 through the service requester application so that the user 197 can select a preferred option.

In various implementations, the network computer system 100 can further include a requester datastore 146 storing service requester profiles specific to the individual users 197 of the on-demand service. Such information can include user preferences of service types, routine routes, origin locations, destinations, work addresses, home addresses, addresses of frequently visited locations (e.g., a gym, grocery store, mall, local airport, sports arena or stadium, concert venue, local parks, and the like). Service requester profiles can also store multi-leg route preferences for users 197, including a maximum number of transfers the user 197 will accept, whether the user 197 prefers lower total cost trips or faster trips, and any time or cost limits for trips.

The network computing system 100 can also include a provider datastore 147 storing service provider profiles indicating information specific to individual service providers 193, such as vehicle type, service qualifications, earnings data, ratings, and service provider experience. These, or other datastores not illustrated, can also store historical data regarding service requester and service provider liquidity for a given area over time, that is, how often a new service provider 193 is expected to be available for on-demand services in the area and how often a user 197 is expected to request service in the area.

In one aspect, the network computer system 100 can store a number of preselected transfer locations as transfer hubs in a transfer location datastore 148. These transfer hubs can be known good locations for transfers, due to factors such as ease of access and safety. For example, a transfer hub with good ease of access may be a public location with many entrances and exits that facilitate vehicle traffic, such as a parking lot, park, or plaza. A transfer hub with high safety gives users 197 a safe place to wait between legs of a multi-leg trip. Safe transfer hubs may have good lighting, a constant influx of other people, police or security personnel, video surveillance, etc. Transfer hubs may also be selected due to provided facilities, such as nearby public restrooms, vending machines, fast food restaurants, etc., which a user 197 could use between legs of a multi-leg trip or a provider 193 could use while waiting for a user 197 to arrive from a previous leg. In some examples, transfer hubs are preselected from popular origin and drop-off locations identified from historical service data and/or ratings and feedback provided by users 197 and providers 193.

Depending on implementation and the availability of transfer hubs in the geographic region, the multi-leg routing service 135 can restrict transfer locations for a multi-leg trip to only transfer hubs, determine non-hub transfer locations for the multi-leg trip, or generate the multi-leg trip using a combination of transfer hubs and non-hub transfer locations.

According to various examples, the network computer system 100 can partition the transport service region into a plurality of geographic sub-regions or areas based on population, number of users, surface area, etc. In some aspects, these sub-regions (or "geos") are hexagonally shaped and form a lattice that covers the transport service region. The network computer system 100 can further collect and store historical supply/demand data for the transport service for each of the partitioned areas. The network computer system 100 can also monitor real-time supply/demand data for each of the partitioned areas. Based on the historical and/or real-time data, the partitioned areas can be scored and/or ranked, or otherwise classified as oversupplied or undersupplied with regards to available providers 193. For example, lower scoring service areas may indicate undersupply, and the network computer system 100 can initiate certain mitigating measures to more evenly distribute transport supply (e.g., providers 193 that can provide transport services) throughout the transport service region. In certain variations, the score of a partitioned service area may also be based on current traffic conditions within the service area and/or the surrounding service areas.

In accordance with various implementations, the scored service areas can enable the network computer system 100 to construct and update a supply distribution model for the entire transport service region. In scoring each service area, the network computer system 100 can monitor the requesting users 197 (e.g., users that have submitted a transport request) versus providers 193 having an available status within the service area. In certain aspects, when a service area has the same or similar number of available providers as requesting users, or submitted transport requests, at any given time, the service area can be classified as being in equilibrium. It is contemplated that an equilibrium condition is ideal for the entire transport service region, such that any transport demand condition within any service area can be readily met with an equal driver supply condition.

Certain strategies utilized by examples described herein involve the selection of transfer locations for multi-leg routes in such a manner that supply tends to move from oversupplied service areas to undersupplied service areas and demand moves from undersupplied areas to oversupplied areas. Based on the model, the multi-leg routing service 135 can take measures to keep providers within undersupplied areas and move requesters into oversupplied service areas. For example, if a user 197 requests transport from an undersupplied area, the multi-leg routing service 135 can select a first transfer location just outside the undersupplied area so that the provider 193 can return to the undersupplied area instead of exacerbating the supply/demand imbalance. A different provider or providers 193 can then transport the user 197 the rest of the way to the transport request destination.

According to examples, service interfaces on the on-demand provisioning server 130 enable the network computer system 100 to exchange data with the service requester devices 110 and the service provider devices 120 over the network 150. For example, the service interfaces can use one or more network resources to exchange communications over one or more wireless networks (e.g., a cellular transceiver, a WLAN transceiver, etc.). The service interfaces can include or implement an externally-facing application programming interface (API) to communicate data with the service requester devices 110 and the service provider devices 120. The externally-facing API can provide access to the on-demand provisioning server 130 via secure channels over the network 150 through any number of methods, including web-based forms, programmatic access via restful APIs, Simple Object Access Protocol (SOAP), remote procedure call (RPC), scripting access, etc.

Figure 2:
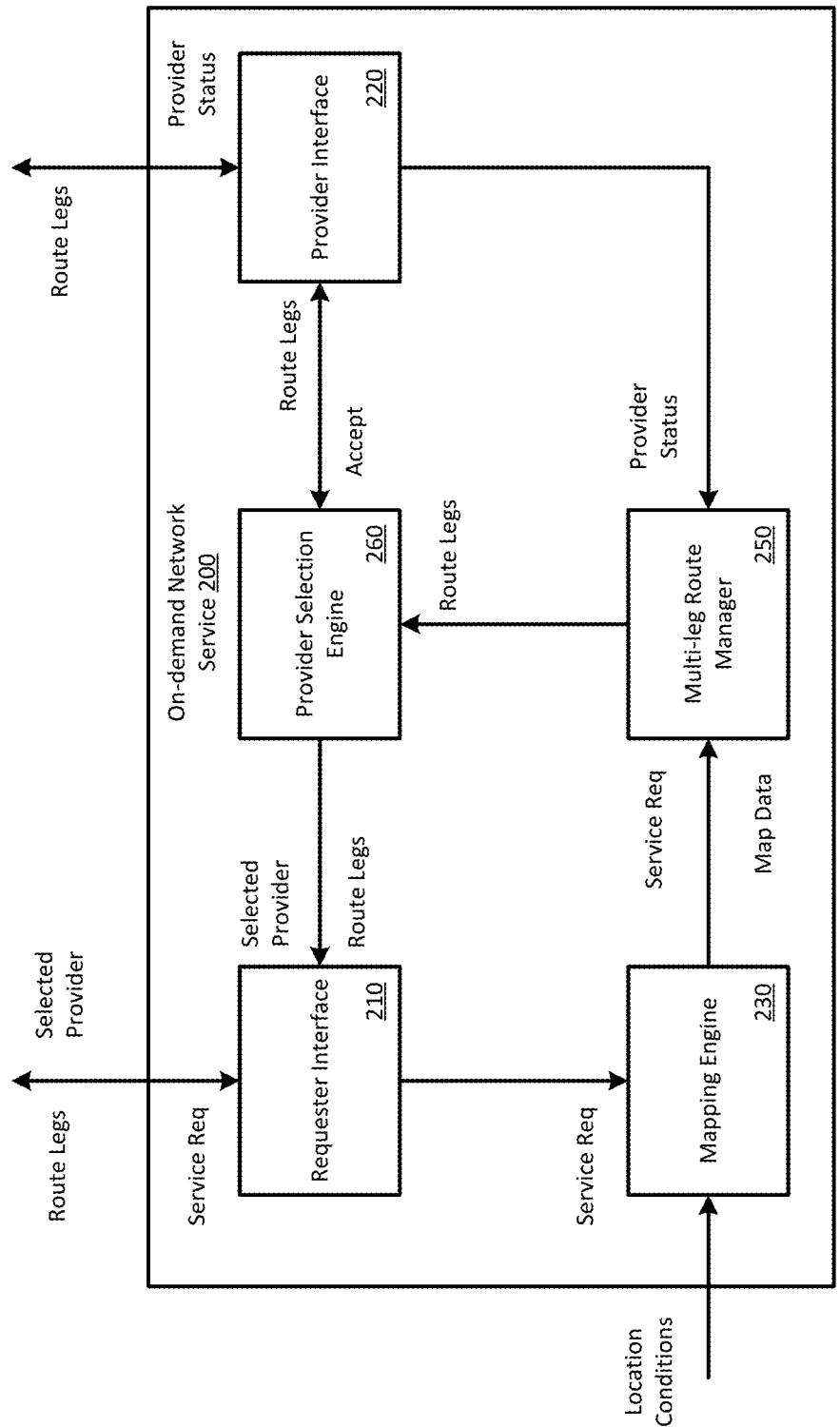
FIG. 2 is a block diagram illustrating an example on-demand network service implementing multi-leg transport, in accordance with examples described herein.

FIG. 2 is a block diagram illustrating an on-demand network service 200, in accordance with examples described herein. The on-demand network service 200 can include a service requester interface 210 to communicate with service requester devices over one or more networks via a service requester application. In one implementation, the service requester application can enable the service requester to scroll through various service types. In response to a selection of a particular service type, the on-demand network service 200 can provide estimated time to arrival (ETA) data on a user interface of the service requester application that indicates the shortest ETA of nearby service providers for the service type and/or the locations of nearby service providers for that service type. As the service requester scrolls through each service type, the user interface can update to show visual representations of the service providers for that service type on a map centered on the service requester or a chosen service location. The service requester can interact with the user interface of the service requester application to select a particular service type and transmit a service request.

In some examples, the service request can include a service location within a given region (e.g., a metropolitan area managed by one or more datacenters corresponding to the network computer system 100) where a selected service provider is to rendezvous with the service requester. The service requester can input the service location by setting a location pin on a user interface of the service requester application, or the service location can be determined by a current location of the service requester (e.g., utilizing location-based resources of the service requester device). Additionally, the service requester can input a service destination during or after submitting the service request. In an example using transport services, the service requester is a prospective passenger that wants to be picked up at the service origin location and dropped off at the service destination.

In some implementations, the service requester can select a desired number of legs for the service request. For example, the requester may select between two or three legs for a long distance trip depending on the requester's preference for a shorter trip or lower cost. Additionally or alternatively, the requester can set a cost target for the service request, and the on-demand network service 200 can attempt to construct a multi-leg trip that meets the cost target.

In some examples, the on-demand network service 200 can include or utilize one or more mapping resources, such as a mapping engine 230 or a third-party mapping service, to generate map data, including traffic data, in the environment surrounding the service location. In addition, the mapping engine 230 can retrieve service provider locations from a provider datastore or provider tracking component and include the locations with the map data. In some implementations, the functionality of the mapping engine 230 is provided on a separate server that the on-demand network service 200 queries, which may be part of the network computer system 100 or a third-party mapping service.

Using the map data from the mapping engine 230 and data from the service request, the multi-leg route manager 250 determines a multi-leg route for the service request. In some aspects, the multi-leg route manager 250 determines the multi-leg route based on multiple parameters from the map data and service request, including the service origin location, destination, any desired number of legs, traffic conditions, supply and demand for service in the region, estimated costs, etc. The multi-leg route manager 250 selects one or more transfer locations between the origin location and destination of the service request. At each transfer location, the user gets out of the vehicle belonging to a first provider and boards a vehicle belonging to a second provider who has been selected for the next leg.

In one implementation, the multi-leg route manager 250 reduces costs to the user making the service request by selecting transfer locations in regions that are not experiencing increased service costs from high demand or lack of supply. The multi-leg route manager 250 can evaluate a set of potential transfer locations between the origin location and destination and select the transfer location or locations that result in the lowest total cost to the user. For example, if the user's origin location is in a region experiencing increased service costs due to supply provisioning issues, a long distance transport from that origin location would be expensive. To alleviate this issue, the multi-leg route manager 250 can generate a multi-leg route with a transfer location just outside the expensive region, which allows the user to only pay the increased rate for a short transport to the transfer location. The user would then pay a regular service rate for the majority of the long distance transport, saving on overall costs.

Once a multi-leg route is generated, the multi-leg route manager 250 can transmit, through the requester interface 210, data corresponding to the route legs for the multi-leg route back to the service requester. These data are displayed to the requester on a user interface of the service requester application, and can show information to the requester such as where each leg starts and ends, estimated travel and wait times for each leg, and the cost to fulfill the service request. In some aspects, the requester can accept the proposed multi-leg route, or the requester can change one or more details, such as the number of legs desired or the destination, and submit another service request. In scenarios other than personal transport, such as food or package delivery, the requester may be presented with alternate information on the user interface that does not include individual route leg details.

In one implementation, upon the requester accepting the proposed multi-leg route, the multi-leg route manager 250 can lock in the route and make no further changes to the transfer locations. In other implementations, as the requester travels along the multi-leg route, the multi-leg route manager 250 can continue to determine, from traffic/weather conditions, supply and demand, etc. if there are faster or less expensive alternative transfer locations. If an alternative is found, the multi-leg route manager 250 can display the alternative to the requester with an indication of the time or cost savings. If the requester selects the alternative route, the multi-leg route manager 250 can update the multi-leg route with the new transfer locations.

In response to the service request, the provider selection engine 260 can select one of the service providers near the service location to fulfill the first leg of the multi-leg route. Multiple invitations may be used to progressively select a provider for the user, using criteria that includes (i) the proximity of the user to the candidate provider in time or distance, (ii) a rating or class association of the provider and/or the user, (iii) user preference for a particular provider, provider or vehicle class, or other characteristic of the provider or transport, and (iv) alternative business logic (e.g., provider bidding process for the service request). In order to handle service requests and select providers, the provider selection engine 260 can use the map data from the mapping engine 230 to determine estimated times of arrival to the origin location for service providers in the geographic area. The map data may also be used to identify the geographic location of individual parties based on their communicated GPS information. The map data may include maps or codes that enable locating parties from their GPS coordinates, as well as information needed for calculating the time and distance separating the two parties. The provider selection engine 260 can also identify profile information about the individual providers and users by querying databases of profile information.

In one aspect, the provider selection engine 260 generates service request invitations for multiple providers to fulfill a leg of the multi-leg service request. The invitations may be sent in parallel (e.g., concurrently), or in series (e.g., sent to one provider, who can then accept or not, then sent to another provider). Each of the initially selected providers is a candidate, selected based on parameters such as proximity, rating, preferences, etc. The candidate provider that is selected to handle the leg may communicate a response via the provider interface 220, which receives the provider communication from the provider device. The provider selection engine 260 can then communicate (i) a notification that informs the user of the provider selection (including optional information about the provider, such as a picture, vehicle identification, rating, and current position) and (ii) updates that convey information about the position of the provider en route to the origin location and/or estimated time of arrival.

In some implementations of multi-leg routing, the provider selection engine 260 only transmits route leg data for the service request that is relevant to the provider to avoid confusion related to cost calculations and trip routing. For example, the provider selection engine 260 may transmit the origin location and destination for the route leg that the provider has agreed to service without any details of the other legs that comprise the multi-leg route. Thus, in some examples, the provider is shown a transfer location as an origin location and another transfer location as the destination. The provider selection engine 260 can also transmit, to providers servicing legs of a multi-leg route, route leg data that includes information such as when the provider needs to arrive at a transfer location and how long the provider needs to wait for the user or users to arrive from a previous leg.

According to aspects, once the user is picked up for each transport leg, position data is obtained from the devices of the user and provider (via the respective device interfaces). A user tracking component uses the position data to track the user by position and time. Similarly, the provider tracking component uses the position data to track the provider by position and time. The mapping engine 230 can be used to place the user's position data and the provider's position data in context to mapping information and other geographic resources. Respective user and provider tracking components communicate the position information of user and provider to the interfaces for output to the user and provider. The output of the respective presentation components may be a geographic output, such as one that would combine the position data of both the user and provider with mapping information. In one implementation, the geographic output is communicated to the user and provider devices via the device interfaces, and thus, both user and provider are able to view the progress of the transport service after pickup. In addition, a provider selected for a subsequent leg can view the progress of a user towards the transfer location on the previous leg.

In some aspects, as the user approaches a transfer location for a leg of a multi-leg route, the multi-leg route manager 250 arranges for a provider for the next leg to rendezvous with the user at the transfer location. In some aspects, once the user is within a threshold amount of time to the transfer location (e.g., 5 minutes, 10 minutes, etc.), the multi-leg route manager 250 requests that the provider selection engine 260 select a provider with an ETA to the transfer location that is similar to the threshold amount of time in order to minimize the amount of time that the user and the provider have to wait for the other to arrive.

In further aspects, the provider selection engine 260 can determine the user ETA from the user's current location to the specified location data point (i.e., the transfer location) and concurrently, can determine the provider ETA for a vehicle (or a set of vehicles) based on the position of the individual vehicles to the specified location data point. For example, the user ETA can be determined based, at least in part, on the current position of the user (e.g., the last received/determined location data point of the user) and the specified location data point, and/or other information, such as transit information corresponding to the method of transit, weather, traffic, etc. Depending on implementation, the provider selection engine 260 can determine the user ETA and the vehicle ETA at substantially the same time or at different instances of time (e.g., different periods). The provider selection engine 260 can continuously determine the ETAs until the ETAs are determined to be substantially equal to or below a programmed threshold. For example, if the threshold is set at 5 minutes and the user and a given provider are both 4 minutes away from the transfer location, the provider selection engine 260 can select the given provider for the next leg of the user's multi-leg route.

In some aspects, the user's travel time or ETA to the transfer location includes a buffer amount of time to perform aspects of the on-demand transport service, including any activities that may be performed after arrival at the transfer location and before switching vehicles for the next leg. For example, these aspects can include time to get out of the vehicle, retrieve luggage from the trunk, check for missing belongings, rate the provider, provide a tip to the provider, locate the vehicle of the next provider, verify the identity of the next provider, etc. Estimated time for these activities can be calculated from historical data from the user profile and aggregate data from other users of the on-demand network service, and may vary depending on conditions such as the time of day, weather, and location.

In one implementation, the multi-leg route manager 250 can arrange for a provider for an upcoming leg of a multi-leg service request in order to facilitate a user swap between two (or more) providers heading in different directions. Thus, when creating the multi-leg route, or at any stage while the route is in progress, the multi-leg route manager 250 can monitor current and incoming service requests to find potential user swap matches. In evaluating a swap match, the multi-leg route manager 250 can weight various criteria, including the supply provisioning of proximate regions, user and provider preferences (e.g., a preference to remain within a certain region), estimated times to arrival, and service costs. If the multi-leg route manager 250 determines that a user swap would benefit multi-leg routes for the involved parties, the multi-leg route manager 250 can generate a route leg for each multi-leg route that ends at a common transfer location and assign corresponding providers. For example, a first user travelling east with a first provider meets at a transfer location with a second user travelling west with a second provider. At the transfer location, the first user boards the vehicle of the second provider and continues eastward, and the second user boards the vehicle of the first provider and continues westward, thus keeping both providers from travelling far from their origins.

FIGS. 3A-D are block diagrams illustrating example multi-leg transport scenarios, in accordance with examples described herein. FIG. 3A illustrates an example of a two-leg shared transport for a single requesting user, where the transport starts from the origin location 310, proceeds with the user and Provider 1, and finishes the first leg transport 312 at transfer location 314. At the transfer location 314, the user exits the vehicle belonging to Provider 1 and gets in to the vehicle belonging to Provider 2, who then proceeds with the user and finishes the second leg transport 316 at the drop-off location 318.

FIG. 3B illustrates an example of two-leg shared transport for two requesting users sharing part of their second leg transport, where the transport starts with service requests from origin location 320 for User 1 and origin location 322 for User 2. The first leg transport 324 for User 1 is provided by Provider 1, and the first leg transport 326 for User 2 is provided by Provider 2. The two first leg transports converge at transfer location 328, then proceed with a pooled second leg transport 330 with Provider 3 transporting both User 1 and User 2. The second leg transport 330 ends at drop-off location 332 for User 1, while Provider 3 continues on with the second leg transport 334 for User 2 to the drop-off location 336 for User 2.

FIG. 3C illustrates an example of two-leg shared transport for two requesting users sharing part of their first leg transport, where the transport starts from origin location 340 for User 1 and proceeds along a first leg route 342 with User 1 and Provider 1 to the Trip 2 origin location 344 for User 2. Provider 1 transports both User 1 and User 2 along the first leg route 346 to trip transfer location 348, where both users exit the vehicle. User 1 proceeds to ride with Provider 2 along a second leg route 350 to Trip 1 drop-off location 354, and User 2 proceeds to ride with Provider 3 along a second leg route 352 to Trip 2 drop-off location 356.

FIG. 3D illustrates an example of three-leg shared transport for two requesting users sharing their second leg transport, where the transport starts with service requests from origin location 360 for User 1 and origin location 362 for User 2. The first leg transport 364 for User 1 is provided by Provider 1, and the first leg transport 366 for User 2 is provided by Provider 2. The two first leg transports converge at transfer location 368, then proceed with a pooled second leg transport 370 with Provider 3 transporting both User 1 and User 2 to a second trip transfer location 372. There, User 1 proceeds to ride with Provider 4 along a third-leg route 374 to Trip 1 drop-off location 378, and User 2 proceeds to ride with Provider 5 along a third-leg route 376 to Trip 2 drop-off location 380.

Figure 4:
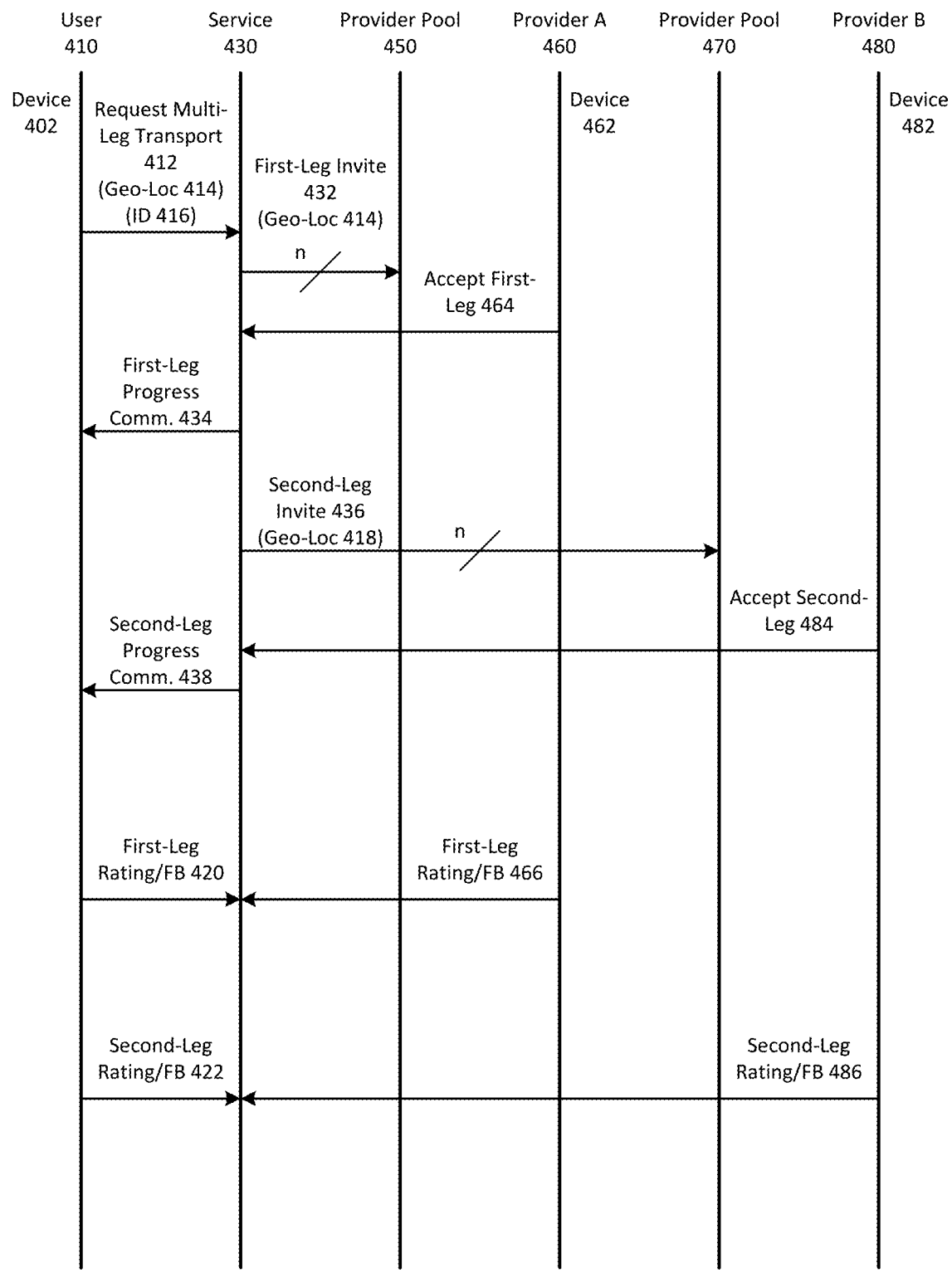
FIG. 4 is a sequence diagram illustrating example interactions between entities in a multi-leg transport, in accordance with examples described herein.

FIG. 4 is a sequence diagram illustrating example interactions between entities in a multi-leg transport, in accordance with examples described herein. In one aspect, a user 410 requests a multi-leg transport from an origin location to a destination. A transport service 430 locates a provider A 460 (also referred to as a 'provider' or 'service provider') from a first pool of possible providers 450 for the first-leg transport, and a provider B 480 from a second pool of possible providers 470 for the second-leg transport, in order to transport the user 410 to the destination.

According to some aspects, the user 410 operates a computing device 402 running a designated service requester application to transmit a service request for a multi-leg transport 412 to an on-demand network service 430. The device 402 may include roaming network capabilities (e.g., a network interface for a cellular network, Wireless Fidelity 802.11 (a), (g) (n), or WiMax, etc.), along with geo-aware resources (e.g., GPS). The network functionality enables the device 402 to transmit the request 412 and communicate further with the service 430 or provider A 460 (for the first leg) and provider B 480 (for the second leg). The geo-aware resources enable the device to automatically include geographic identification information 414 that identifies the geographic location of the user 410 when making the request 412, and geographic identification information 418 that identifies the geographic location of the user 410 when making the second-leg invite 436. The device 402 may also be configured to include identification information that identifies the user 410 to either the service 430 or to the providers. The identification information 416 includes, for example, a name, account number, a rating, and/or picture of the user making the request 412. A transfer location (for the first leg) or destination address (for the second leg) may also be included with the identification information 416.

According to some aspects, the service 430 processes the request 412 in order to determine the transfer locations between transport legs and to select candidate providers that can provide the requested transport. The service 430 is able to use identification information 416 to identify an account or profile of the user 410. The account or profile of the user 410 may include an image of the user 410, preferences of the user 410 (e.g. type of vehicle the user prefers), the rating of the user 410 (which may be averaged from ratings by providers that have previously interacted with the user 410), and historical information such as previous providers that have provided transport to the user 410. Such preferences, rating information, historical information, and other profile information can be used to select providers for the user 410. For example, for a given service request, the service may first attempt to locate a provider that the user 410 has previously used (and perhaps provided a good rating for). As an alternative or addition, some or all of the account/profile information may be stored with the user's device 402 and communicated as part of the user's request 412.

The service 430 uses information contained in the user request 412 to select a provider A 460 (for the first leg) and provider B 480 (for the second leg) based on various criteria. The criteria may include (i) proximity of the individual candidate providers to the user 410 or the transfer location, (ii) a class or rating of the candidate providers 450 and 470, based on reputation and/or level/quality of service (such as provided by rating/feedback of past instances), and (iii) availability of the candidate providers 450 and 470, in terms of any time, distance, or region limits that the providers have set (e.g., a provider may have indicated that they do not want to leave a certain region or be online past a certain time). The criteria may also include user-specified preferences, including specific identification by the user 410 of a particular provider or previous providers that have serviced the user 410 and whom have received good feedback.

In order to arrange transport for the user 410, the service 430 implements a pairing process upon receipt of the request 412 (for the first leg) or upon near-completion of the first-leg transport (for the second leg). The service 430 performs the pairing process by (i) using the one or more criteria to select a first candidate provider, and (ii) sending an invitation 432 (for the first leg) or invitation 436 (for the second leg) to a first candidate, then giving the first candidate a short duration to accept the invitation. If the first candidate provider declines or fails to accept the invitation, the service 430 selects a second candidate provider using the one or more criteria and sends the invitation 432 (for the first leg) or invitation 436 (for the second leg) to the second candidate, with a short duration to accept. The pairing process may be repeated (n times) until a provider 460 A from the first provider pool 450 communicates back an acceptance 464 to the invitation 432 for the first leg, or a provider B 480 from the second provider pool 470 communicates back an acceptance 484 to the invitation 436 for the second leg.

As an alternative to a single pairing process, another aspect provides for selecting providers by contacting a set of two or more providers at once, based on criteria such as described above. The particular provider that ultimately is selected may correspond to, for example, the first provider in the set to respond and accept the invitation.

Either as part of the first-leg invitation 432 and the second-leg invitation 436, or in a follow on communication (following acceptance 464 of the first-leg invitation or acceptance 484 of the second-leg invitation), the service 430 may specify, to the selected providers 460 and 480, information about the user 410 that includes: (i) the reputation of the user 410 (e.g. the user's feedback as provided by other providers), (ii) the expected earnings for providing transport for the user 410, (iii) the geographic location of the user 410, and (iv) the destination or transfer location to use as a drop-off point for the user 410. The user's picture or other identification information may also be communicated to the accepting provider. Thus, for example, the providers 460 and 480 are able to identify the user 410 from sight when they arrive to pick up the user 410.

According to some aspects, the providers 460 and 480 are equipped with devices that can communicate with geo-aware mobile devices of the users. In particular, the providers 460 and 480 may have portable/mobile and personal devices 462 and 482, such as cellular voice/data devices with geo-aware resources that the providers can carry with them into and out of their vehicles. In one aspect, the devices 462 and 482 of the candidate providers share a platform (e.g., application level) with the devices 402 used by the users. The shared platform enables each party to exchange communications across shared functionalities and user interfaces.

Once the provider 460 (for the first leg) and 480 (for the second leg) start traveling to the user 410, a series of progress communications 434 (for the first leg) and 438 (for the second leg) are communicated to the user 410. The progress communications 434, 438 may be generated automatically, using program instructions that cause the device 462, 482 to utilize its geo-aware resources to automatically generate location information of the providers 460 (for the first leg) and 480 (for the second leg) as they progress towards the location of the user 410. The progress communications 434, 438 are communicated to the user 410 using network communications. The progress communications 434 may be communicated directly from the providers 460 (for the first leg) and 480 (for the second leg) to the user 410, or via the service 430. On pickup, the user 410 and the providers 460, 480 are each facilitated in that identification information for each party has been communicated to the other. These progress communications 434, 438 may include identification information such as the picture of the other party in order to facilitate the pickup process when the provider and the user 410 arrive at the same geographic location.

According to an aspect, once a provider picks up the user 410, one or both devices can be used to perform price monitoring functions. The price monitoring functions enable the calculation of the fee for the trip charged to the user 410. In one aspect, the fee determination is based on the distance or route travelled and/or the time that the user 410 is in the vehicle. The fee determination may also be determined based on a formula or factors that are specific to a particular transport company or service 430. Stop and wait times may be calculated, either by monitoring the GPS information communicated from devices, or from the use of accelerometers that are sometimes included in the hardware of mobile devices. Numerous other parameters may be used to determine the price for the transport, including origin location, drop-off location, route information, duration, market condition, desirability, etc.

After the user 410 is driven to a transfer location or the drop-off destination, one or both parties may provide feedback about the other. The user 410 may provide a rating or feedback 420, 422 to service 430, to rate the user's experience with provider A 460 and provider B 480, respectively, for each leg of transport. Likewise, the providers 460 and 480 can provide a rating or feedback 466 and 486 for the user 410. The service 430 may associate profiles or accounts with each of the user 410 and providers 460 and 480, and the rating/feedbacks may affect the overall rating of the user/provider. Thus, the reputation of the user 410 or the providers 460 and 480 may be influenced by the feedback provided by the other party.

Figure 5:
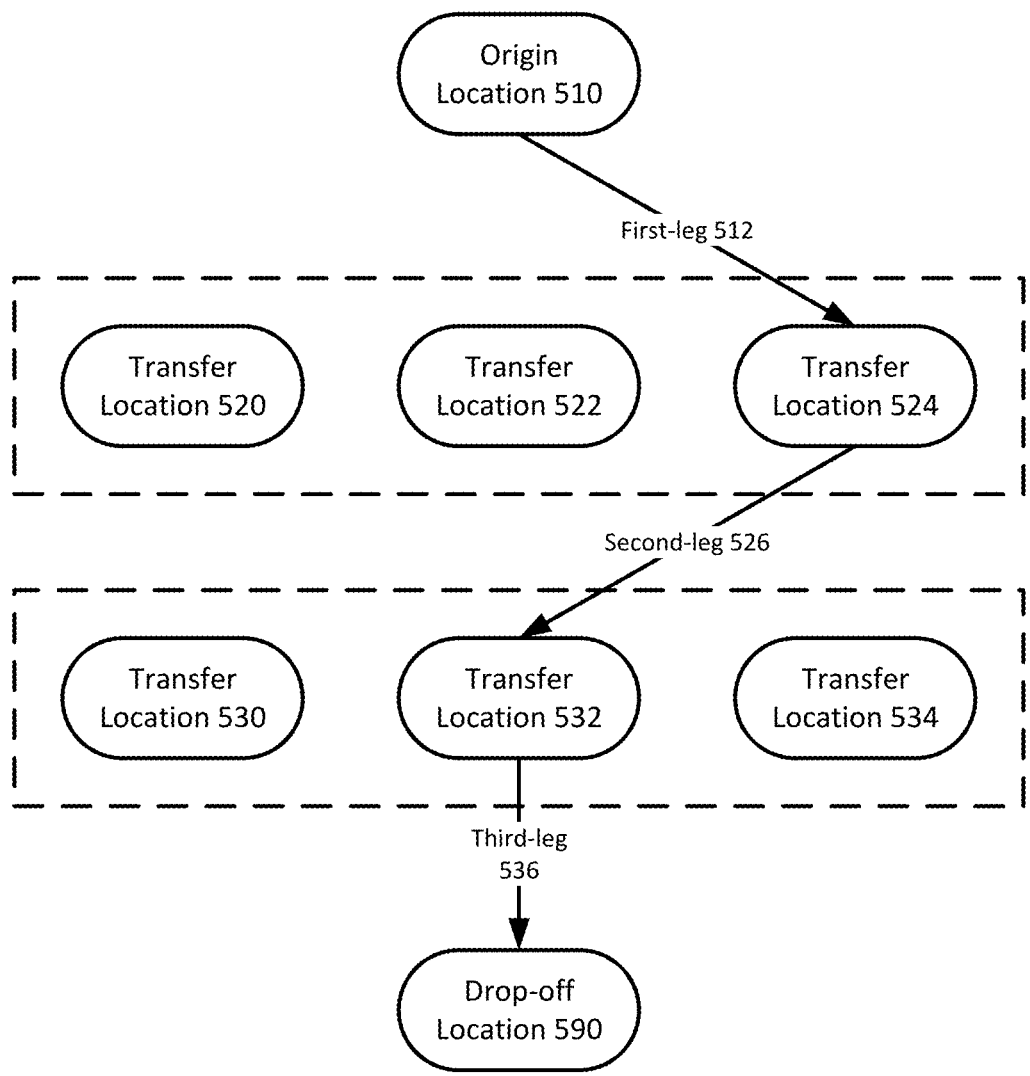
FIG. 5 is a block diagram illustrating an example multi-leg transport scenario, in accordance with examples described herein.

FIG. 5 is a block diagram illustrating an example multi-leg transport scenario, in accordance with examples described herein. For a given origin location 510 and drop-off location 590, an initial list of candidate transfer locations can be selected by sorting the total transport distance or total estimated traveling time for a multi-leg route by using various combinations of available transfer locations between the origin location 510 and drop-off location 590.

In the example illustrated, the multi-leg route is divided into three legs between two sets of candidate transfer locations. The first set of candidate transfer locations includes transfer locations 520, 522, and 524. The second set of candidate transfer locations includes transfer locations 530, 532, and 534. A multi-leg routing service can weight various criteria to determine which transfer location to select from each set. These criteria can include traffic conditions, service provider availability around each transfer location, region pricing information for each transfer location, pairing opportunities with other requesters, user preferences, etc.

In one implementation, the multi-leg routing service can select transfer locations from each set in order to avoid regions with increased service prices. For example, the region containing transfer locations 520 and 522 may be experiencing increased prices due to higher demand and lack of providers in the region. As a result, the multi-leg routing service selects transfer location 524 as the transfer location for the first leg 512. Assuming none of the transfer locations in the second set have increased service prices, the multi-leg routing service selects transfer location 532 for the second leg 526 based on the other criteria. The multi-leg routing service then creates a third leg 536 connecting the transfer location 532 to the drop-off location 590.

Figure 6A:
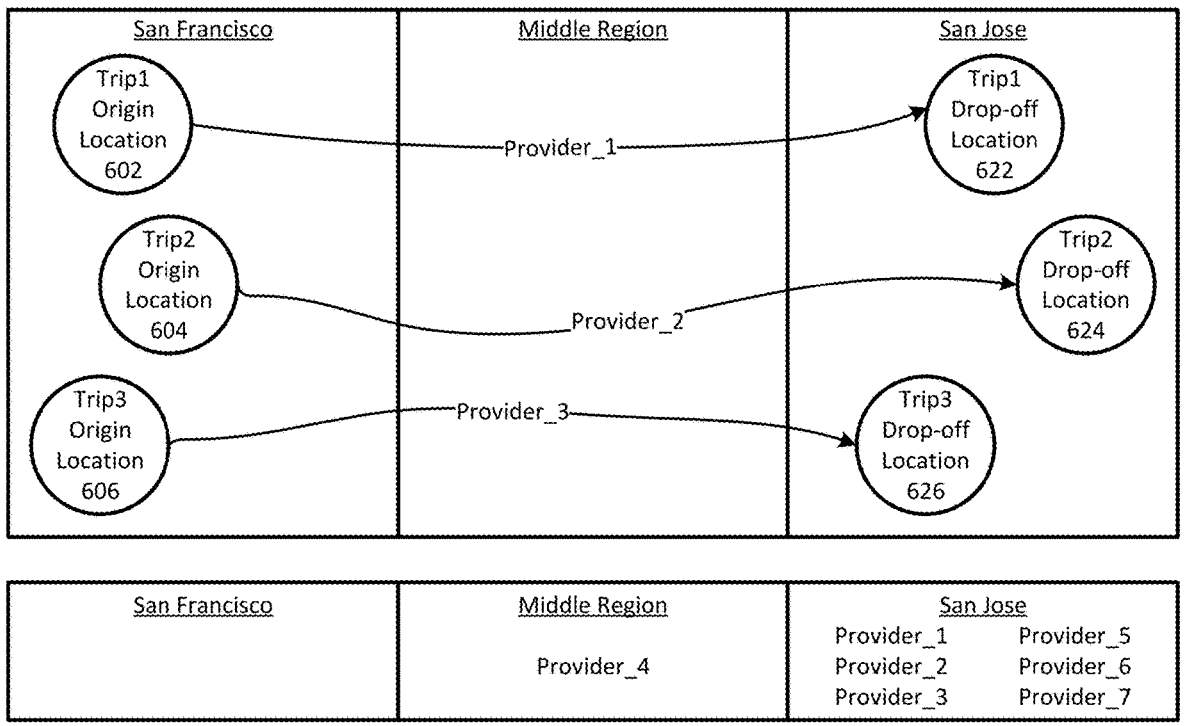
FIGS. 6A and 6B are block diagrams illustrating example supply provisioning scenarios, in accordance with examples described herein.
Figure 6B:
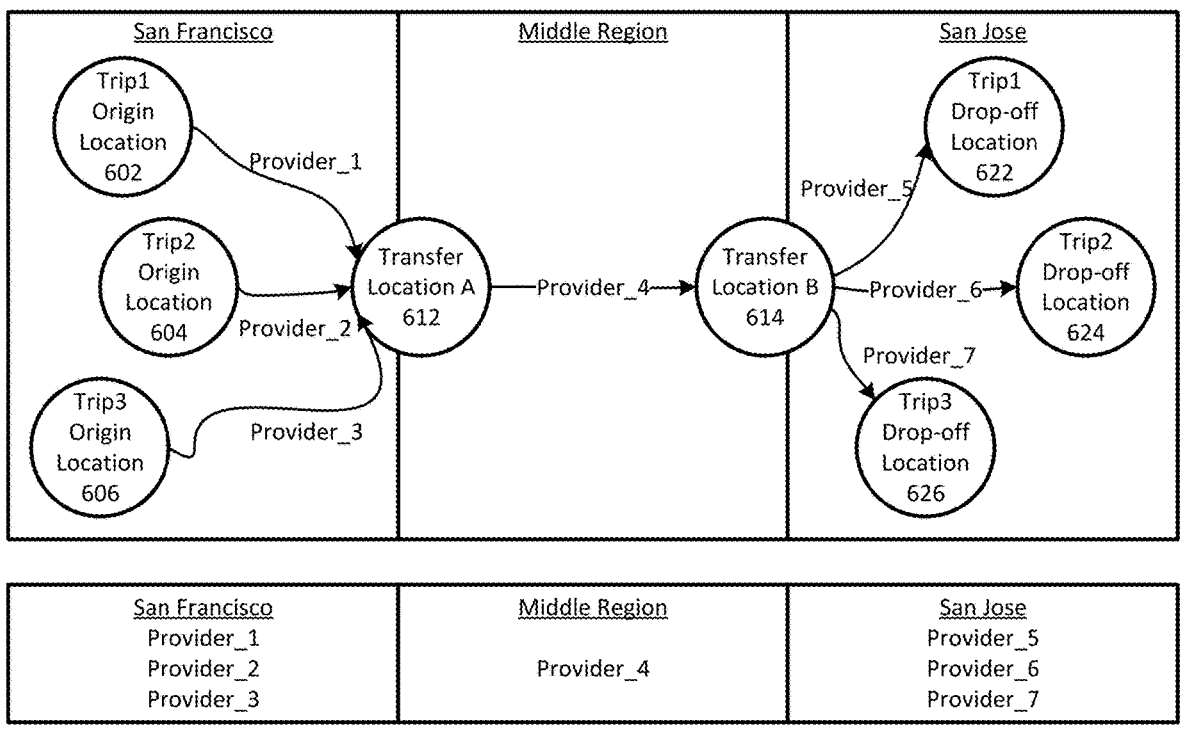

FIGS. 6A and 6B are block diagrams illustrating example supply provisioning scenarios, in accordance with examples described herein. In one aspect, the multi-leg routing service can factor in supply provisioning within multiple geographic regions when generating multi-leg routes for a service request. Thus, rather than potentially worsening a supply and demand imbalance, the multi-leg routing service can maintain supply distributions closer to equilibrium. In addition, the multi-leg routing service can combine legs of service requests from multiple users in order to increase vehicle occupancy and service cost and time efficiencies. The multi-leg routing service can therefore determine how many legs to divide a route into, which transfer locations are selected, which providers are selected for each leg, etc. based on supply and demand data for geographic regions that include origin and drop-off locations for service requests.

In FIG. 6A, three users request service from a first geographic region, San Francisco, to a second geographic region, San Jose. In the example depicted, San Francisco and San Jose both start with three providers in each region, and there is one provider in a geographic region between the cities. When each of the three users take a single leg transport, a first provider takes the first user directly from trip 1 origin location 602 to trip 1 drop-off location 622, a second provider takes the second user directly from trip 2 origin location 604 to trip 2 drop-off location 624, and a third provider takes the third user directly from trip 3 origin location 606 to trip 3 drop-off location 626. As a result, the three providers end up in San Jose to add to the three that were already there, leaving San Francisco with no providers, which is an unbalanced supply distribution. In addition, the provider for the middle region between the cities remains idle.

In one implementation, the multi-leg routing service generates route legs that cluster service requests from multiple users together into shareable legs in order to balance supply provisioning, increase vehicle occupancy, and alleviate situations such as the one illustrated in FIG. 6A. In the example of FIG. 6B, there are three active requesting users in San Francisco with destinations in San Jose. The multi-leg routing service can schedule three providers for the first leg to transport each of the users to transfer location A 612. In some aspects, the multi-leg routing service selects transfer location A 612 from a set of possible transfer locations based on its proximity to San Jose and having a roughly similar estimated time to arrival for each of the three providers.

As the users and providers approach transfer location A 612, the multi-leg routing service arranges for the fourth provider to wait at transfer location A 612 for each of the three users to arrive. In some aspects, once the last arriving user is within a threshold amount of time to the transfer location (e.g., 5 minutes, 10 minutes, etc.), the multi-leg routing service selects a provider with an ETA to transfer location A 612 that is similar to the threshold amount of time in order to minimize the amount of time that the users and the provider have to wait for the others to arrive. Once the fourth provider and the users have arrived, the fourth provider transports the users to transfer location B 614 near San Jose. As they approach transfer location B 614, the multi-leg routing service can arrange one or more providers in the San Jose region to take each of the users to their destinations. The number of providers selected depends on the locations of the destinations and whether a provider can efficiently travel to more than one of them with a pool of users. In the example illustrated, the multi-leg routing service selects three separate providers in the San Jose region to individually transport the users to their destinations. As a result of this multi-leg service arrangement, the providers remain in the same region and are available for serving additional service requests immediately after completing their legs. In addition, the resulting supply distribution between the regions is unchanged, and no provider was idle.

User Interface Examples

Figure 7A:
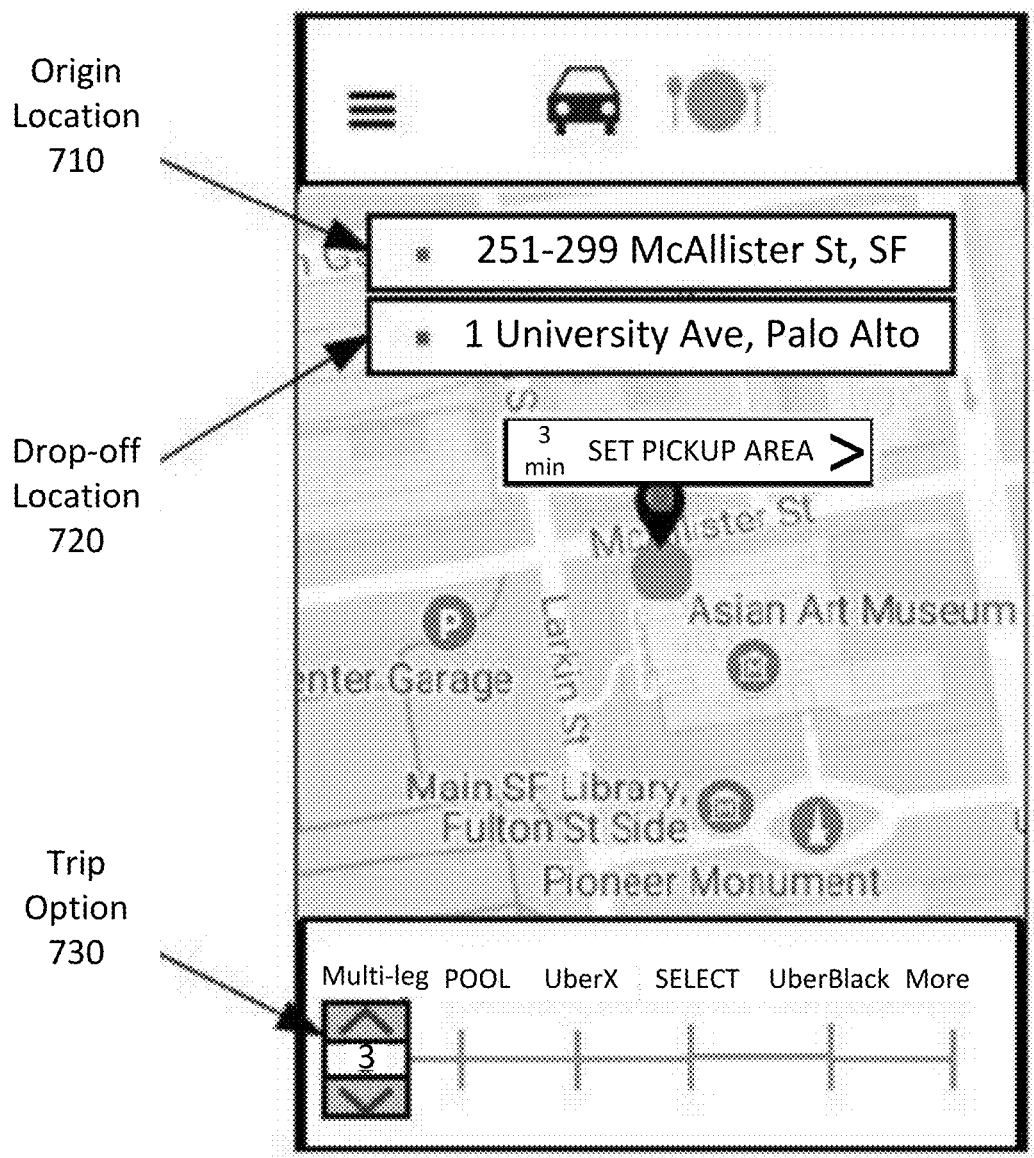
FIGS. 7A and 7B are illustrations of example user interfaces for a designated service requester application executed on a user device, in accordance with examples described herein.
Figure 7B:
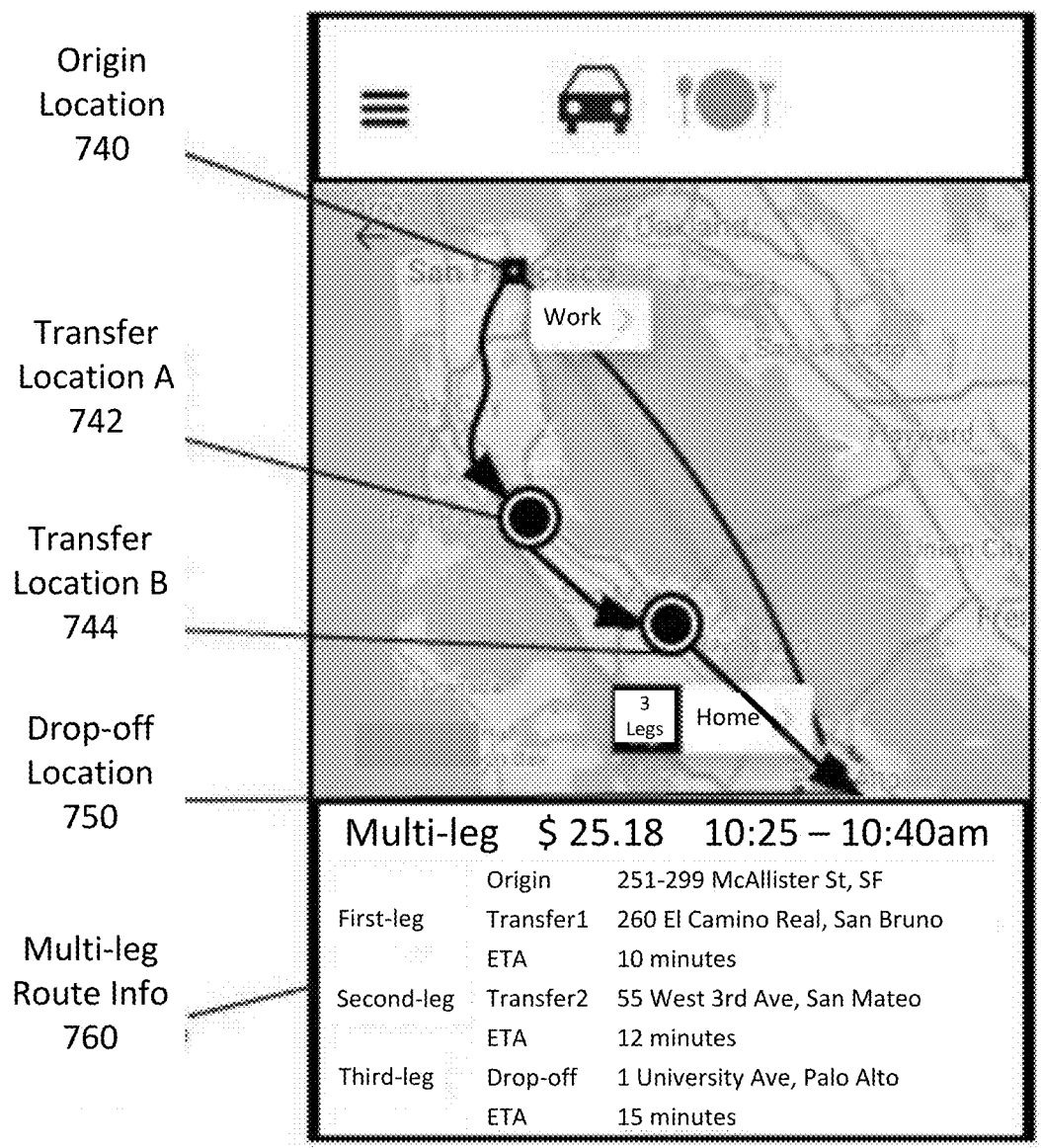

FIGS. 7A and 7B are illustrations of example user interfaces for a designated service requester application executed on a user device, in accordance with examples described herein. In some aspects, execution of a service requester application on the service requester device can cause the device to generate user interfaces on the device's touch-sensitive display.

FIG. 7A shows a user interface depicting an example in which the user is shown their current location on a map with options to set an origin location 710 and drop-off location 720, as well as a trip option 730 to select a desired number of legs for a multi-leg transport.

After user submits the service request and the on-demand network service arranges for a multi-leg transport route, the service requester application can display a user interface as shown in the example of FIG. 7B. This example displays a map of the multi-leg route to the user, including the starting origin location 740, transfer location A 742, and transfer location B 744. The user interface can also display multi-leg route information 760, including the service cost, estimated arrival time window, addresses of each transfer location, and ETAs for each transport leg.

Methodology

Figure 8:
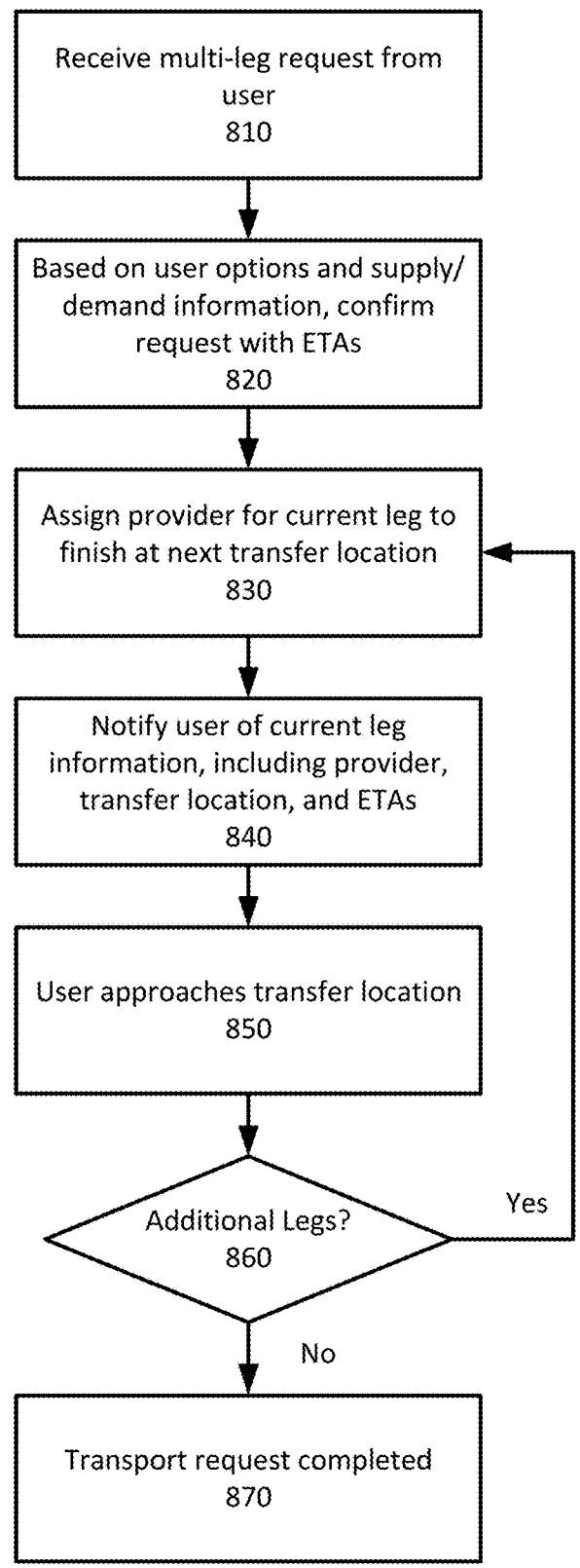
FIG. 8 is a flow chart describing an example method of operating a network service with multi-leg transport, in accordance with examples described herein.

FIG. 8 is a flow chart describing an example method of operating a network service with multi-leg transport, in accordance with examples described herein. Although some operations of the method are described below as being performed by specific components of the computer systems illustrated in FIGS. 1 and 2, it will be appreciated that these operations need not necessarily be performed by the specific components identified, and could be performed by a variety of components and modules, potentially distributed over a number of machines. Accordingly, references may be made to elements of the on-demand provisioning server 130 for the purpose of illustrating suitable components or elements for performing a step or sub step being described. Alternatively, at least certain ones of the variety of components and modules described in the multi-leg routing service 135 and on-demand network service 200 can be arranged within a single hardware, software, or firmware component. It will also be appreciated that some of the steps of these methods may be performed in parallel or in a different order than illustrated.

An on-demand network service receives a service request for a multi-leg route from a user (810). In some implementations, the user can select a desired number of legs for the service request using an interface of a service requester application running on a user device. For example, the requester may select between two or three legs for a long distance trip depending on the requester's preference for a shorter trip or lower cost.

Using map data and data from the service request, the network service determines a multi-leg route for the service request. In some aspects, the network service determines the multi-leg route based on multiple parameters from the map data and service request, including the service location, destination, any desired number of legs, traffic conditions, supply and demand for service in the region, estimated costs, etc. The network service selects one or more transfer locations between the origin location and destination of the service request. At each transfer location, the user gets out of the vehicle belonging to a first provider and boards a vehicle belonging to a second provider who has been selected for the next leg.

Once a multi-leg route is generated, the network service can transmit data corresponding to the route legs for the multi-leg route back to the requesting user to be displayed on a user interface of the service requester application. The route leg data can show information to the user such as where each leg starts and ends, estimated travel and wait times for each leg, and the cost to fulfill the service request. The user can then confirm the request and accept the multi-leg route (820).

In response to the service request, the network service can select one of the service providers near the service location to fulfill the first leg of the multi-leg route by transporting the user to the first transfer location (830). Once a provider accepts the service request, the network service can transmit data to be displayed on the service requester device that informs the user about the current leg, including information about the provider, transfer location, and estimated time to arrival (840).

During the transport, the network service monitors the location of the user to calculate the user's ETA to the transfer location and determines when the user is approaching the transfer location (850). In some aspects, the user is considered to be approaching the transfer location when the user's ETA is below a programmed threshold (e.g., 5 minutes, 10 minutes, etc.). If there are remaining legs in the multi-leg route (860), the network service arranges for a provider for the next leg to rendezvous with the user at the transfer location. Otherwise, the user is approaching the destination, and the transport request is considered completed upon arrival and performance of miscellaneous aspects of the service (870).

Service Requester Device

Figure 9:
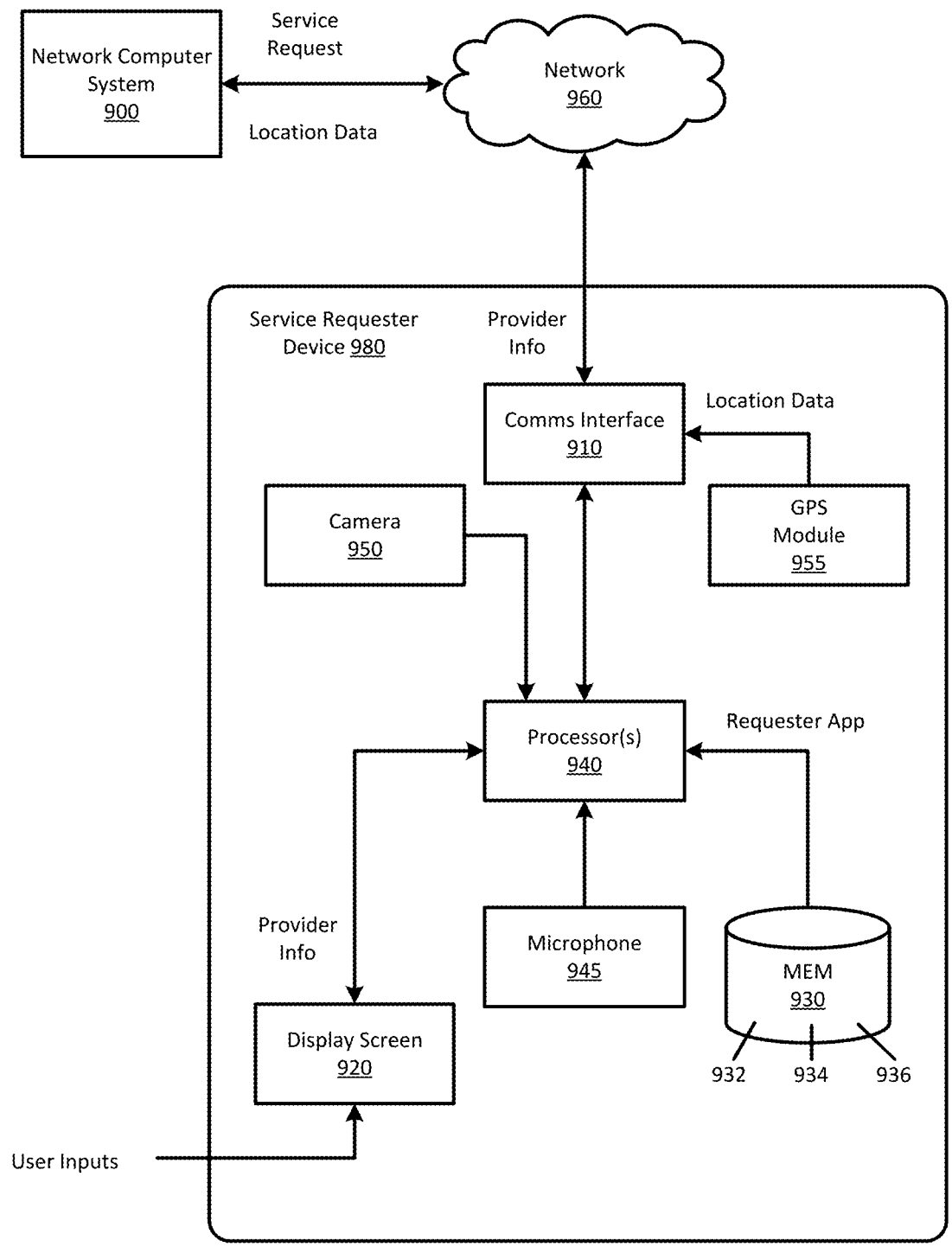
FIG. 9 is a block diagram illustrating an example service requester device executing a designated service requester application for an on-demand service, in accordance with examples described herein.

FIG. 9 is a block diagram illustrating an example service requester device, or user device, executing a designated service requester application for an on-demand service, as described herein. In many implementations, the service requester device 980 can comprise a mobile computing device, such as a smartphone, tablet computer, laptop computer, VR or AR headset device, and the like. As such, the service requester device 980 can include typical telephony features such as a microphone 945, a camera 950, and a communication interface 910 to communicate with external entities using any number of wireless communication protocols. In certain aspects, the service requester device 980 can store a designated application (e.g., a service requester application 932) in a local memory 930. In many aspects, the service requester device 980 further stores information corresponding to a contacts list 934 and calendar appointments 936 in the local memory 930. In variations, the memory 930 can store additional applications executable by one or more processors 940 of the service requester device 980, enabling access and interaction with one or more host servers over one or more networks 960.

In response to user input, the service requester application 932 can be executed by a processor 940, which can cause an application interface to be generated on a display screen 920 of the service requester device 980. The application interface can enable the service requester to, for example, check current price levels and availability for the on-demand arrangement service. In various implementations, the application interface can further enable the service requester to select from multiple ride service types, such as a carpooling service type, a regular ride-sharing service type, a professional ride service type, a van on-demand service type, a luxurious ride service type, and the like.

The processor 940 can transmit a service request via a communications interface 910 to the backend network computer system 900 over a network 960. In various examples, the service requester device 980 can further include a GPS module 955, which can provide location data indicating the current location of the requester to the network computer system 900 so that the network computer system 900 can select an appropriate service provider to fulfill the service request. In alternative aspects, hard-wired circuitry may be used in place of or in combination with software instructions to implement aspects described herein. Thus, aspects described are not limited to any specific combination of hardware circuitry and software.

Hardware Diagram

Figure 10:
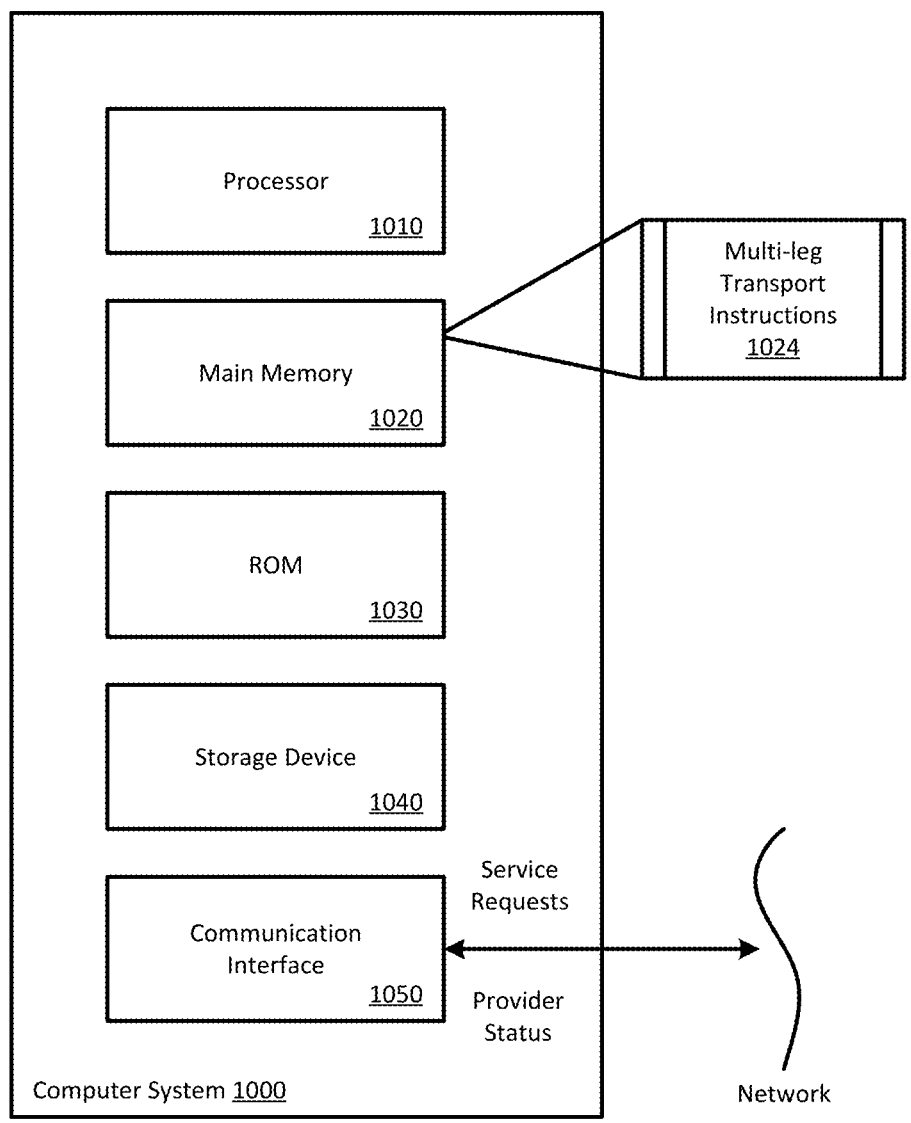
FIG. 10 is a block diagram illustrating a computer system upon which examples described herein may be implemented.

FIG. 10 is a block diagram that illustrates a computer system upon which examples described herein may be implemented. A computer system 1000 can be implemented on, for example, a server or combination of servers. For example, the computer system 1000 may be implemented as part of a network service for providing on-demand services. In the context of FIG. 1, the network computer system 100 may be implemented using a computer system 1000 such as described by FIG. 10. The network computer system 100 may also be implemented using a combination of multiple computer systems as described by FIG. 10.

In one implementation, the computer system 1000 includes processing resources 1010, a main memory 1020, a read-only memory (ROM) 1030, a storage device 1040, and a communication interface 1050. The computer system 1000 includes at least one processor 1010 for processing information stored in the main memory 1020, such as provided by a random access memory (RAM) or other dynamic storage device, for storing information and instructions which are executable by the processor 1010. The main memory 1020 also may be used for storing temporary variables or other intermediate information during execution of instructions to be executed by the processor 1010. The computer system 1000 may also include the ROM 1030 or other static storage device for storing static information and instructions for the processor 1010. A storage device 1040, such as a magnetic disk or optical disk, is provided for storing information and instructions.

The communication interface 1050 enables the computer system 1000 to communicate with one or more networks (e.g., a cellular network) through use of the network link (wireless or wired). Using the network link, the computer system 1000 can communicate with one or more computing devices, one or more servers, and/or one or more self-driving vehicles. In accordance with some examples, the computer system 1000 receives service requests from mobile computing devices of individual users. The executable instructions stored in the memory 1030 can include multi-leg transport instructions 1024 to perform one or more of the methods described herein when executed.

By way of example, the instructions and data stored in the memory 1020 can be executed by the processor 1010 to implement an example network computer system 100 of FIG. 1. In performing the operations, the processor 1010 can handle service requests, provider statuses, and service invitations to facilitate fulfilling the service requests. The processor 1010 executes instructions for the software and/or other logic to perform one or more processes, steps and other functions described with implementations, such as described by FIGS. 1 through 9.

Examples described herein are related to the use of the computer system 1000 for implementing the techniques described. According to one example, those techniques are performed by the computer system 1000 in response to the processor 1010 executing one or more sequences of one or more instructions contained in the main memory 1020. Such instructions may be read into the main memory 1020 from another machine-readable medium, such as the storage device 1040. Execution of the sequences of instructions contained in the main memory 1020 causes the processor 1010 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A network computer system for managing an on-demand transport service, comprising:
   one or more processors; and
   a memory storing instructions that, when executed by the one or more processors, cause the network computer system to perform operations comprising:
      receiving, over one or more networks, data corresponding to a transport request from a device of a user, the transport request including an origin location in a first geographic region and a destination in a second geographic region;
      scoring geographic regions or sub-regions, including the first geographic region and the second geographic region, between the origin location and the destination based on real-time data indicative of supply and demand for the on-demand transport service in each of the geographic regions or sub-regions;
      determining one or more transfer locations for the transport request, including at least a first transfer location, between the origin location and the destination for the transport request;
      selecting, from one or more candidate providers, a first provider to transport the user from the origin location to the first transfer location;
      generating a first route from the origin location to the first transfer location;
      remotely monitoring the position of the user as the user travels along the first route to the first transfer location;
      querying one or more mapping resources to determine first travel time on the first route to the first transfer location, wherein the first travel time is based at least on one of a distance between the position of the user and the first transfer location, traffic conditions, or time to perform aspects of the on-demand transport service; and
      in response to determining that the first travel time is within a first threshold amount of time, selecting a second provider to transport the user from the first transfer location to either a second transfer location or the destination for the transport request.

2. The network computer system of claim 1, wherein the memory stores further instructions that, when executed by the one or more processors, cause the network computer system to perform operations comprising:
   determining the second transfer location between the first transfer location and the destination;
   remotely monitoring the position of the user as the user travels along a second route to the second transfer location;

querying the one or more mapping resources to determine second travel time on the second route to the second transfer location, wherein the second travel time is based at least on one of a distance between the position of the user and the second transfer location, traffic conditions, or time to perform aspects of the on-demand transport service; and in response to determining that the second travel time is within a second threshold amount of time, selecting a third provider to transport the user from the second transfer location to either a third transfer location or the destination for the transport request.

3. The network computer system of claim 1, wherein a number of transfer locations is chosen by the user as part of the transport request.

4. The network computer system of claim 1, wherein the one or more transfer locations and a number of transfer locations are determined based on at least one of the distance between the origin location and the destination, an estimated travel time between the origin location and the destination, costs for the transport request, or supply provisioning data for the on-demand transport service for the first geographic region and the second geographic region.

5. The network computer system of claim 1, wherein the device is equipped with a location-based resource, and the position of the user is remotely monitored through a service application running on the device that accesses the location-based resource.

6. The network computer system of claim 1, wherein the position of the user is remotely monitored by monitoring the position of a vehicle of the respective provider transporting the user.

7. The network computer system of claim 1, wherein selecting the first provider includes communicating data corresponding to the user, the origin location, and the first transfer location to a computing device of the first provider.

8. The network computer system of claim 1, wherein selecting the second provider includes communicating data corresponding to the user, the first transfer location, and the second transfer location or destination to a computing device of the second provider.

9. The network computer system of claim 1, wherein the transfer locations, including the first transfer location and the second transfer location, are selected based at least on the real-time data indicative of supply and demand for the on-demand transport service in each of the geographic regions or sub-regions.

10. A method of managing an on-demand transport service, the method being implemented by one or more processors and comprising:
receiving, over one or more networks, data corresponding to a transport request from a device of a user, the transport request including an origin location in a first geographic region and a destination in a second geographic region;
scoring geographic regions or sub-regions, including the first geographic region and the second geographic region, between the origin location and the destination based on real-time data indicative of supply and demand for the on-demand transport service in each of the geographic regions or sub-regions;
determining one or more transfer locations for the transport request, including at least a first transfer location, between the origin location and the destination for the transport request;

selecting, from one or more candidate providers, a first provider to transport the user from the origin location to the first transfer location;
generating a first route from the origin location to the first transfer location;
remotely monitoring the position of the user as the user travels along the first route to the first transfer location;
querying one or more mapping resources to determine first travel time on the first route to the first transfer location, wherein the first travel time is based at least on one of a distance between the position of the user and the first transfer location, traffic conditions, or time to perform aspects of the on-demand transport service; and
in response to determining that the first travel time is within a first threshold amount of time, selecting a second provider to transport the user from the first transfer location to either a second transfer location or the destination for the transport request.

11. The method of claim 10, further comprising:
determining the second transfer location between the first transfer location and the destination;
remotely monitoring the position of the user as the user travels along a second route to the second transfer location;
querying the one or more mapping resources to determine second travel time on the second route to the second transfer location, wherein the second travel time is based at least on one of a distance between the position of the user and the second transfer location, traffic conditions, or time to perform aspects of the on-demand transport service; and
in response to determining that the second travel time is within a second threshold amount of time, selecting a third provider to transport the user from the second transfer location to either a third transfer location or the destination for the transport request.

12. The method of claim 10, wherein a number of transfer locations is chosen by the user as part of the transport request.

13. The method of claim 10, wherein the one or more transfer locations and a number of transfer locations are determined based on at least one of the distance between the origin location and the destination, an estimated travel time between the origin location and the destination, costs for the transport request, or supply provisioning data for the on-demand transport service for the first geographic region and the second geographic region.

14. The method of claim 10, wherein the device is equipped with a location-based resource, and the position of the user is remotely monitored through a service application running on the device that accesses the location-based resource.

15. The method of claim 10, wherein the position of the user is remotely monitored by monitoring the position of a vehicle of the respective provider transporting the user.

16. The method of claim 10, wherein selecting the first provider includes communicating data corresponding to the user, the origin location, and the first transfer location to a computing device of the first provider.

17. The method of claim 10, wherein the transfer locations, including the first transfer location and the second transfer location, are selected based at least on the real-time data indicative of supply and demand for the on-demand transport service in each of the geographic regions or sub-regions.

18. A non-transitory computer-readable medium that stores instructions, executable by one or more processors, to cause the one or more processors to perform operations of an on-demand transport service that comprise:
- receiving, over one or more networks, data corresponding to a transport request from a device of a user, the transport request including an origin location in a first geographic region and a destination in a second geographic region;
- scoring geographic regions or sub-regions, including the first geographic region and the second geographic region, between the origin location and the destination based on real-time data indicative of supply and demand for the on-demand transport service in each of the geographic regions or sub-regions;
- determining one or more transfer locations for the transport request, including at least a first transfer location, between the origin location and the destination for the transport request;
- selecting, from one or more candidate providers, a first provider to transport the user from the origin location to the first transfer location;
- generating a first route from the origin location to the first transfer location;
- remotely monitoring the position of the user as the user travels along the first route to the first transfer location;
- querying one or more mapping resources to determine first travel time on the first route to the first transfer location, wherein the first travel time is based at least on one of a distance between the position of the user and the first transfer location, traffic conditions, or time to perform aspects of the on-demand transport service; and
- in response to determining that the first travel time is within a first threshold amount of time, selecting a second provider to transport the user from the first transfer location to either a second transfer location or the destination for the transport request.

* * * * *